United States Patent [19]
Nakajima et al.

[11] Patent Number: 6,151,432
[45] Date of Patent: Nov. 21, 2000

[54] UNIVERSAL OPTICAL FIBER CONNECTORS AND BASIC PLUGS THEREOF

[75] Inventors: Masahiro Nakajima; Hiroyuki Tokita; Junji Taira; Kouji Minami; Tatsuo Koshigoe; Nobuo Suzuki, all of Koto-ku, Japan

[73] Assignee: Seiko Instruments Inc., Japan

[21] Appl. No.: 08/891,901

[22] Filed: Jul. 14, 1997

[30] Foreign Application Priority Data

| Jul. 15, 1996 | [JP] | Japan | 8-205339 |
| Dec. 9, 1996 | [JP] | Japan | 8-328829 |
| Apr. 14, 1997 | [JP] | Japan | 9-096225 |
| Apr. 14, 1997 | [JP] | Japan | 9-096226 |
| Apr. 14, 1997 | [JP] | Japan | 9-096227 |
| Apr. 14, 1997 | [JP] | Japan | 9-096228 |
| Jul. 9, 1997 | [JP] | Japan | 9-183792 |

[51] Int. Cl.$^7$ ................................ G02B 6/38
[52] U.S. Cl. .................. 385/60; 385/55; 385/72
[58] Field of Search .................. 385/60, 55–72

[56] References Cited

U.S. PATENT DOCUMENTS

| 4,178,068 | 12/1979 | Hoover | 385/60 |
| 4,898,446 | 2/1990 | Hinckley | 385/60 |
| 5,067,783 | 11/1991 | Lampert | 385/60 |
| 5,133,032 | 7/1992 | Salter et al. | 385/60 |
| 5,142,601 | 8/1992 | Shibata et al. | 385/86 |
| 5,321,784 | 6/1994 | Cubukciyan et al. | 385/78 |

FOREIGN PATENT DOCUMENTS

| 330231A2 | 8/1989 | European Pat. Off. . |
| 366346A2 | 10/1989 | European Pat. Off. . |
| 567809A2 | 11/1993 | European Pat. Off. . |
| 731369A2 | 9/1996 | European Pat. Off. . |
| WO9424594 | 10/1994 | WIPO . |

OTHER PUBLICATIONS

Patent Abstracts of Japan, vol. 013, No. 215 (P–874) May 19, 1989.
Patent Abstracts of Japan, vol. 007, No. 121 (P–199) May 25, 1983.

Primary Examiner—Rodney Bovernick
Assistant Examiner—Ellen E. Kang
Attorney, Agent, or Firm—Adams & Wilks

[57] ABSTRACT

Universal optical fiber connectors and their basic plugs, wherein the optical fiber connectors have some common elements for their connector-functions to permit an installation of optical fiber into one of the different type connectors for establishing their connection more easily and to facilitate a tuning operation with positioning key maintaining the same direction between eccentricity of the fiber core and the key. The basic plug has a ferrule, a spring element, and a cylindrical tube. The spring element is positioned between a ferrule and a cylindrical tube, so that it exerts forces toward them in an axial direction. The ferrule has a common dimensional structure for securing an optical fiber and has a shape enabling the connection to any one of various kinds of housing members. Thus, the basic plug connects separate optical fibers together through the housing member.

7 Claims, 24 Drawing Sheets

UNIVERSAL OPTICAL FIBER CONNECTORS AND BASIC PLUGS THEREOF

BACKGROUND OF THE INVENTION

1. Field of the Invention

The present invention relates to universal optical fiber connectors and their basic plugs, wherein the optical fiber connectors have some common elements for their connector-functions to permit an installation of optical fiber into one of the different type connectors for establishing their connector to connector connection more easily and to facilitate a tuning operation with positioning key maintaining the same direction between eccentricity of the fiber core and the key.

For the sake of clarity, in general, the technical term "optical fiber connectors" means all of the elements where each of them is terminated on an end portion of an optical fiber. Conceptually, the optical fiber connector may be of any shape, such as a plug with a tip formed as a male member, an adapter with a tip formed as a female member, a combination thereof, or the like.

2. Description of Related Art

Heretofore, an optical fiber connector has the configuration in which a ferrule is coupled to a plug flame after fixing an optical fiber into the center of the ferrule to establish a connection between different optical fibers in opposite directions.

A FC-type plug as an example of such conventional optical fiber connector is depicted in FIG. 24. As shown in the figure, the FC-type plug comprises a ferrule 101, a frame 102, and a tightening member 103, with an integrated configuration of coaxially arranging these elements around a bare optical fiber 99 as the center thereof. Furthermore, there is a key ring 104 oriented along a direction of a displacement of the center of the bare optical fiber 99 fixed in the ferrule 101.

For coupling the plugs 100 together, it is necessary to provide an adapter 201 for connecting plugs to its ends, respectively. The adapter 201 is comprised of a flange portion 202 and a cylindrical portion 203 in a one-piece design. An outer peripheral surface of the cylindrical portion 203 has a male screw thread 204 and a depressed portion 205. Also, a mating slot 206 is concentrically formed in the center of the cylindrical portion 203. In an inner side of the mating slot 206, there is a separate sleeve 207 on which the ferrule 101 of the plug 100 is fit and attached in a removable manner.

For coupling the plug 100 with the adapter 201, a positioning key 104a is engaged into the depressed portion 205 in addition to fitting the ferrule 101 of the plug 100 into the separate sleeve 207 of the adapter 201 to adjust their positions so as to be in their right places in a circumferential direction. Then a female thread 105a of a coupling nut 105 is screwed to a male screw thread 204, so that the plug 100 is coupled to the adapter 201 tightly and thus it prevents them from becoming detached.

Up to the present, optical fiber connectors of the FC, SC, ST type, and so on with various connection forms have been commercially used. In this case, the different type optical fiber connectors are grouped together so as to put them to proper use. Under certain circumstances such as the changing of a system configuration, the need for the mutual connection between the different types of optical fiber connectors comes about and thus a converting adopter is required. Therefore, there are several problems including that many different types of converting adapters should be prepared so as to be used in the mutual connection and a quality of signal to be transmitted is decreased as an optical loss in optical transmission path is increased.

Conventionally, furthermore, it is very difficult to detach the key ring when it should be shifted in the right place to adjust eccentricity of the fiber core after the completion of the connector assembly. Depending on the connector type, moreover, the position of the key ring cannot be re-adjusted.

There may be cases where the optical fiber connector is fitted to an end portion of an optical fiber cable or an optical fiber code in installing the necessary wiring in a building, a mechanical system, or the like. In this case, optical fiber connectors of the FC, SC, ST type, and so on with various connection forms should be selected and combined to proper use depending on their applications.

Under certain circumstances, such as the changing of a system configuration, the need for the mutual connection between the different types of optical fiber connectors comes about and thus a converting adapter is required. Therefore, there are several problems including that many different types of converting adapters should be prepared so a to be used in the mutual connection and a quality of signal to be transmitted is decreased as an optical loss in optical transmission path is increased.

In general, an adapter to be provided as a coupling portion of the optical fiber connector has two end portions, one for fixing on a fixing member such as a panel and the other for receiving a plug to be fixed to an optical fiber cable or the like.

There may be cases where a ferrule's tip of the plug fixed through the adapter requires cleaning for preventing a loss in the optical transmission path. However, there is a problem that it is very difficult to clean the ferrule's tip of the plug in a state of being coupled with the adapter.

To solve those problems laid-open, Japanese Patent Application No. 122570/1996 discloses a tightening mechanism of a plug that allows removal of an adapter from its fixing member.

According to the above document, there is a problem that the method is costly performed because it requires an intricate structure for laterally fixing a standard type plug on a fixing member such as a panel in a special shape.

For using the optical fiber connector in installing the necessary wiring in a building or a mechanical system, as described above, the optical fiber connector should have an excellent strength against bending stress.

For various use in various environments, the optical fiber connector should have long term stability.

SUMMARY OF THE INVENTION

Therefore, a first object of the present invention is to provide a basic plug to solve the above problems in the conventional related art and to easily establish connection with an optical fiber without depending on the type of connector to cope with much more sophisticated devices.

A second object of the present invention is to provide a universal optical fiber connector to solve the above problems in the conventional related art and to easily establish connection with an optical fiber without depending on the type of connector to cope with much more sophisticate devices.

A third object of the present invention is to provide a jack-housing to solve the above problems in the conventional related art and to easily establish connection with an optical fiber without depending on the type of connector to cope with much more sophisticated devices.

A fourth object of the present invention is to provide a universal optical fiber connector that enables the user to clean a ferrule's head in spite of being fixed on a panel or the like.

A fifth object of the present invention is to provide a universal optical fiber connector that enables its end portion connecting with an optical fiber or the like to generate an excellent strength against bending stress.

A sixth object of the present invention is to provide a ferrule-holding member and a universal connector to be manufactured at low cost with the properties of rust free and good environmental stability.

In the first aspect of the present invention, a basic plug for connecting separate optical fibers together through a housing member comprises:

a ferrule having at least one common dimensional structure for securing an optical fiber;
a spring element being held so as to exert force against said ferrule in an axial direction; and
a cylindrical tube having a function of securing an optical fiber cable in which said optical fiber is embedded and a function of holding said spring element by sandwiching said spring element between said cylindrical tube and said ferrule, wherein
said basic plug has a shape that enables to engage said housing member and to connect said optical fiber to another optical fiber through said housing.

Here, the basic plug may further comprise an engaging member that includes:

a mating portion having a flange on at least a part of a periphery thereof, in which the rear end portion of said ferrule is fitted;
a long-sized cylinder portion coaxially arranged on said rear end portion of said ferrule, on which said spring element is held; and
an engaging portion to be engaged to said cylindrical tube formed on the rear end portion of said long-sized cylinder portion, wherein
said spring is held between said flange of said mating portion and said cylindrical tube by engaging said engaging portion to said cylindrical tube in addition to hold said engaging portion on a periphery of said continuous cylinder portion.

The engaging portion may be continuously formed on said long-sized cylinder portion and is provided as an engaging protrusion that protrudes outward and is inwardly deformable in a radius direction, and said engaging protrusion and said long-sized cylinder portion are able to insert in said cylindrical tube where an engaging hole in which said engaging protrusion is able to engage.

The insert-restricting portion for restricting an amount of inserting said long-sized cylinder portion to said cylindrical tube may be mounted on an outer peripheral surface of said long-sized cylinder portion.

The insert-restricting portion may be a protrusion or short-sized cylindrical tube having an outside shape thereof which is a lightly larger than an inner diameter of said cylindrical tube.

In the second aspect of the present invention a universal optical fiber connector, comprises:

a basic plug of the first aspect of the present invention, and
a housing member to be fitted on said basic plug.

Here, the housing member may incorporate a sleeve to be fitted on said ferrule, and also said housing member has an engaging portion on its tip portion on a side thereof opposite to a side of said basic plug, where said engaging portion conforms to various kinds of connector forms.

The plug housing may comprise: a key member for an alignment in a diagonal direction around an axis of said ferrule; and a plurality of engaging holes, and said cylindrical tube of said basic plug has at least one elastic engaging piece, wherein
said elastic engaging piece is able to engage in a predetermined engaging hole selected from said plurality of said engaging holes at a time of inserting said cylindrical tube into said plug housing.

The plug housing may connect to a plug that conforms to various kinds of connector forms through an adapter that conforms to various kinds of connector forms to allow an optical connection between an optical fiber fixed in said ferrule and an optical fiber fixed in a ferrule in said plug.

The housing member may be an adapter housing having an engaging portion on its tip portion on a side thereof opposite to a side of said basic plug, and said engaging portion is for engaging to another basic plug that conforms to various kinds of connector forms, wherein
at a time of engaging another basic plug in said engaging portion of said adapter housing, a ferrule of another basic plug is fitted into said sleeve to allow an optical connection between an optical fiber in said ferrule and said optical fiber in said ferrule of said basic plug.

The adapter housing may comprise: a key member for an alignment in a diagonal direction around an axis of said ferrule; and a plurality of engaging holes, and said cylindrical tube of said basic plug has a least one elastic engaging piece, wherein
said elastic engaging piece is able to engage in a predetermined engaging hole selected from said plurality of said engaging holes at a time of inserting said cylindrical tube into said adapter housing.

On a side of said tip portion of said adapter housing, there may be a key member for an alignment in a diagonal direction around an axis of said ferrule of another basic plug; and a plurality of engaging holes, and a cylindrical tube of another basic plug has at least one elastic engaging piece, wherein
said elastic engaging piece is able to engage in a predetermined engaging hole selected from said plurality of said engaging holes at a time of inserting said cylindrical tube into said adapter housing.

The adapter housing may be able to engage to a plurality of said basic plugs, and a tip portion of said adapter housing has a plurality of engaging portion to be engaged to another basic plug.

The housing member may be a jack housing having an engaging portion on tis tip portion on a side thereof opposite to a side of said basic plug, and said engaging portion is for engaging to a plug that conforms to various kinds of connector forms, where
at a time of engaging another basic plug in said engaging portion of said jack housing, a ferrule of another basic plug is fitted into said sleeve to allow an optical connection between an optical fiber in said ferrule and said optical fiber in said ferrule of said basic plug.

The jack housing may comprise: a key member for an alignment in a diagonal direction around an axis of said ferrule; and a plurality of engaging holes, and said cylindrical tube of said basic plug has at least one elastic engaging piece, wherein said elastic engaging piece is able to engage in a predetermined engaging hole selected from said plurality of said engaging holes at a time of inserting said cylindrical tube into said jack housing.

The plug may be a plug that conforms to an optical fiber connector in a type of one selected from a group of FC, SC, and ST.

In the third aspect of the present invention, a jack housing for a universal optical fiber connector to be used for fitting to a basic plug of the first aspect of the present invention to allow an connection between said basic plug and a plug that conforms to various kinds of connector forms, comprises:

an sleeve integrated therein to be fitted to said ferrule;

an engaging portion formed on one side thereof to be engaged to said basic plug; and an engaging portion formed on the other side thereof to be engaged to said plug that conforms to various kinds of connector forms, wherein a ferrule of said plug is fitted in said sleeve when said plug is engaged to said engaging portion, allowing an optical connection between an optical fiber of said ferrule and said optical fiber in said ferrule of said basic plug.

Here, jack housing may comprise: a key member for an alignment in a diagonal direction around an axis of said ferrule; and a plurality of engaging holes, and said cylindrical tube of said basic plug has at least one elastic engaging piece, wherein said elastic engaging piece is able to engage in a predetermined engaging hole selected from said plurality of said engaging holes at a time of inserting said cylindrical tube into said jack housing.

The plug may be a plug that conforms to an optical fiber connector in a type of one selected from a group of FC, SC, and ST.

The housing member may have one end portion provided as a plug housing that conforms to various kinds of connector forms, wherein a flange portion is formed on at least one part of an outer peripheral portion of said plug housing, for fixing said plug housing on a fixing member.

The plug housing may comprise: a key member for an alignment in a diagonal direction around an axis of said ferrule; and a plurality of engaging holes, and said cylindrical tube of said basic plug has at least one elastic engaging piece, wherein said elastic engaging piece is able to engage in a predetermined engaging hole selected from said plurality of said engaging holes at time of inserting said cylindrical tube into said plug housing.

The plug housing may connect to a plug that conforms to various kinds of connector forms through an adapter that conforms to various kinds of connector forms to allow an optical connection between an optical fiber fixed in said ferrule and an optical fiber fixed in a ferrule in said plug.

The flange portion of said plug housing may have a hole for tightening with a thread member.

In the fourth aspect of the present invention, a universal optical fiber connector, comprises:

a basic plug as claimed in claim 1; an engaging ring for connecting an optical code tensile strength body to an outer peripheral portion of said basic plug; a plug housing for covering said ferrule and said basic plug; a hood having a securing hole for securing an optical code, where said hood fits on an outer peripheral portion of said plug housing and covers a connected portion of said code tensile strength body, said optical fiber connector further comprising:

a reinforcing pipe having one end portion to be fitted on an outside of said plug housing and the other end portion surrounding said engaging ring.

Here, the reinforcing pipe may be placed on an inner peripheral portion of said hood.

In the fifth aspect of the present invention, a universal optical fiber connector comprises:

a ferrule having at least one common dimensional structure for securing an optical fiber;

a forcing element made of rubber or elastomer, being held so as to exert force against said ferrule in an axial direction; and a securing member for securing said forcing member for sandwiching said forcing element between said securing member and said ferrule; and a connecting member for incorporating said securing member and for connecting to a plug or adapter of various kinds of connector forms.

Here, the connecting member may be a plug housing which is able to connect to an adapter that conforms to various kinds of connector forms.

The connecting member may be an adapter housing which is able to connect to an adapter that conforms to various kinds of connector forms.

In the sixth aspect of the present invention, a ferrule holding member comprises:

a ferrule having at least one common dimensional structure for securing an optical fiber;

a forcing element made of rubber or elastomer, being held so as to exert force against said ferrule in an axial direction; and a securing member for securing said forcing member for sandwiching said forcing element between said securing member and said ferrule.

Here, securing member may be a cylindrical tube having a function of securing an optical fiber cable in which said optical fiber is integrated.

The forcing member may be shaped so as to hold a plurality of ferrules in parallel.

BRIEF DESCRIPTION OF THE DRAWINGS

With the above and other objects in view that will better appear, the nature of the invention will be more clearly understood by following detailed description, the appended claims and several views illustrated in the accompanying drawings.

In the drawings.

DETAILED DESCRIPTION OF THE PREFERRED EMBODIMENTS

Figure 1:
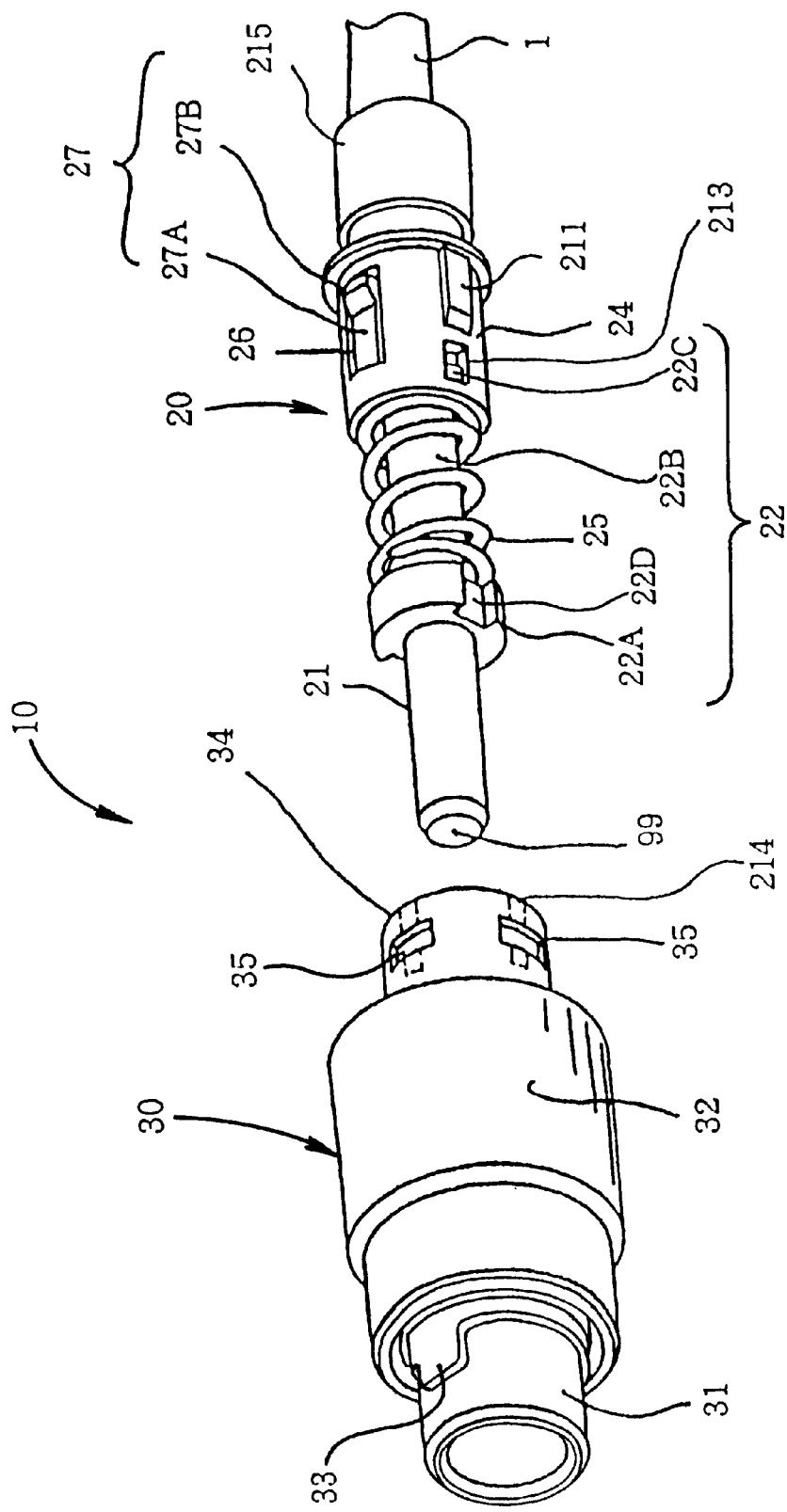
FIG. 1 is a perspective view of a universal optical fiber connector as a first embodiment of the present invention.

Referring now to the drawings, we will describe the embodiments of the present invention by way of example.

Embodiment 1

Figure 2:
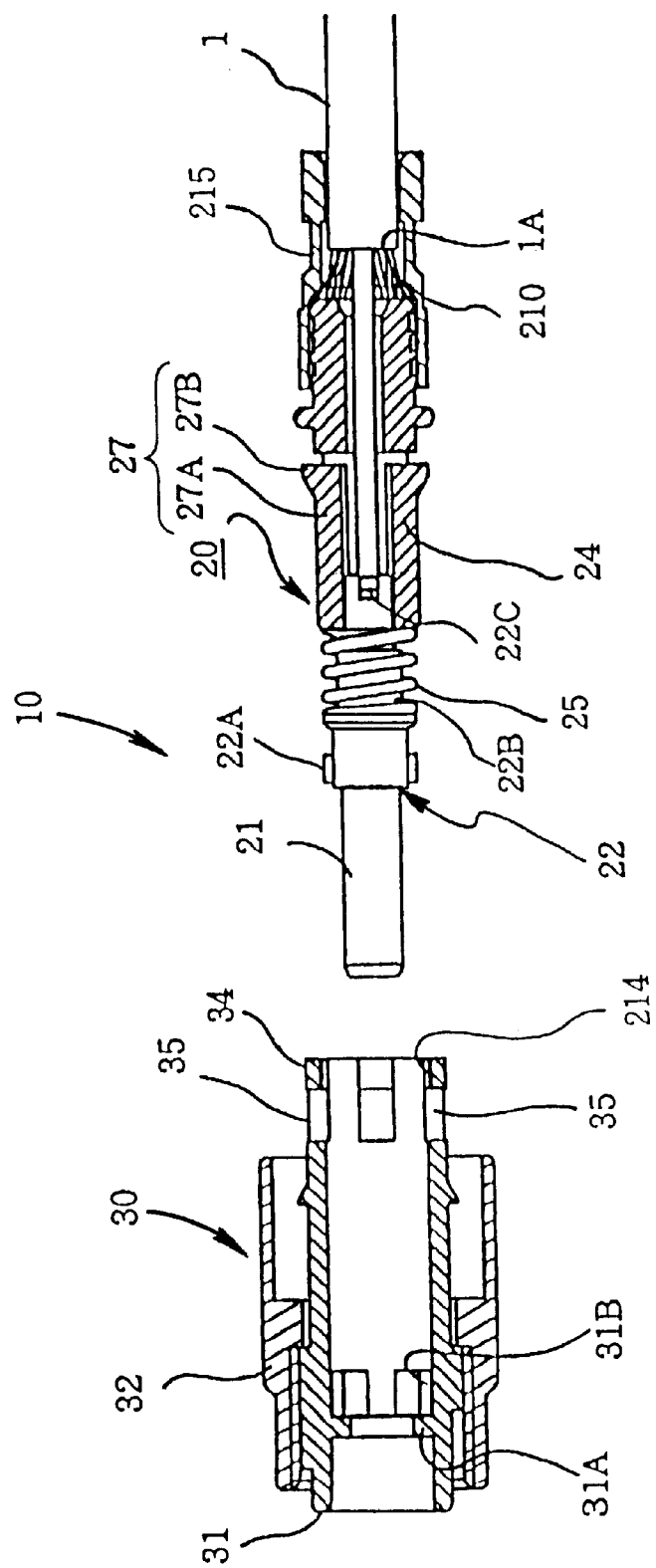
FIG. 2 is a cross sectional view of the universal optical fiber connector as the first embodiment of the present invention.

FIG. 1 is an exploded perspective view of a universal optical fiber connector as one of the embodiments of the present invention. FIG. 2 is a cross sectional plan view of the optical fiber connector shown in FIG. 1, where a plug housing and a basic plug are depicted as separated cross sections, respectively.

In FIGS. 1 and 2, the universal optical fiber connector 10 is in the type of FC and is comprised of a basic plug 20 in which an optical fiber cable 1 is being fitted and a FC plug housing 30 for accommodating the basic plug 20.

Figure 24:
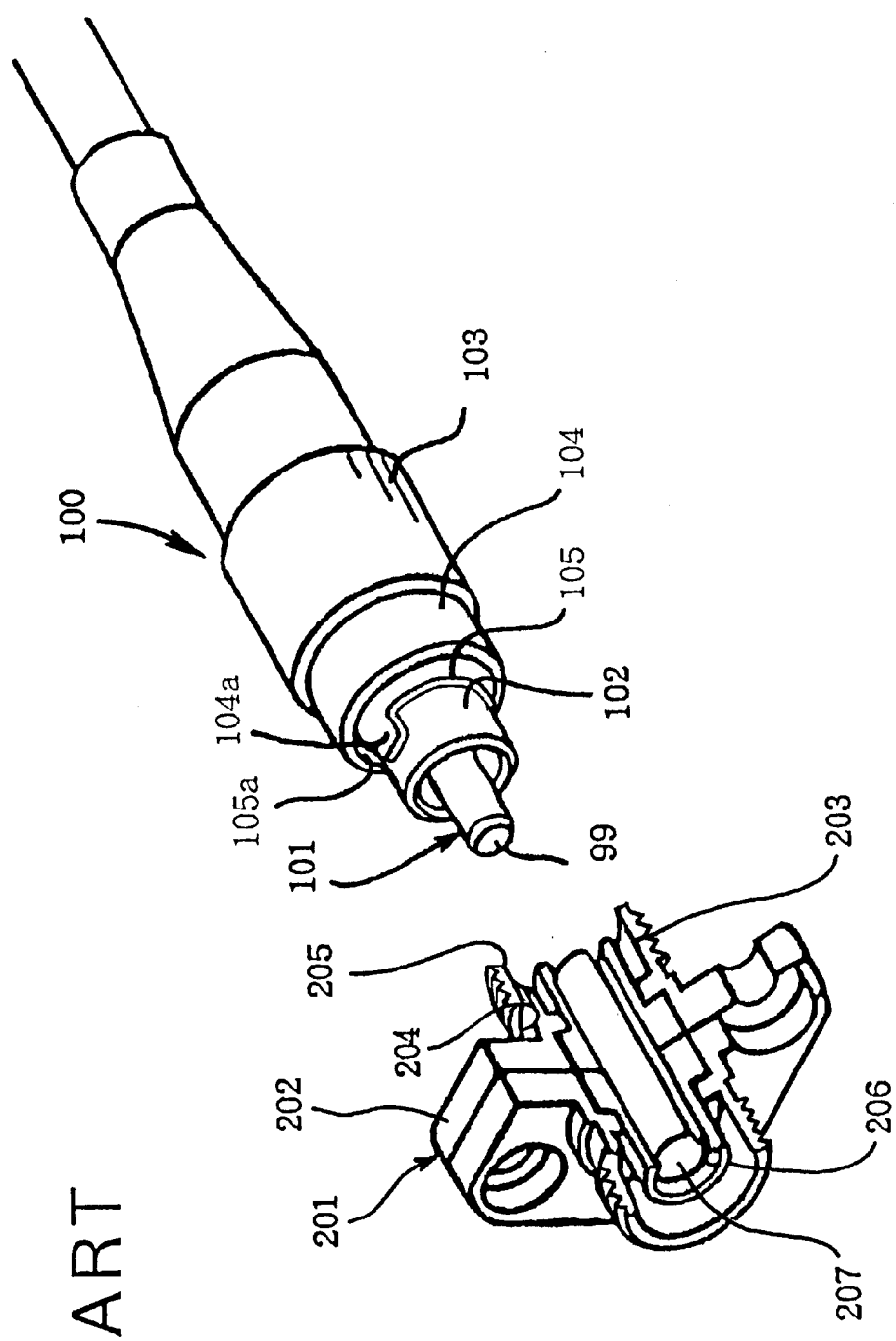
FIG. 24 is a perspective view of a conventional optical fiber connector.

The FC plug housing 20 comprises a thread-fastening member 32 fitted to a mating member 31 for receiving the basic plug 20 in a manner as described below. In addition, a key ring 33 (FIG. 1) is fixed on an outer peripheral surface of the mating member 31 by an appropriate means and is provided as an index key that has the function of adjusting direction of core eccentricity. The structure of fixing the key ring 33 on the mating member 31 is, for example a well-known conventional structure as shown in FIG. 24.

The other end of a mating member 31, which is on the side receiving the basic plug 20, is formed as an insert end portion 34 in which a ferrule can be inserted. Furthermore, engaging slots 35 are formed in a peripheral surface of the insert end portion 34 at established intervals. In this embodiment, there are four engaging slots 35 allowing 90 degrees spacing.

The basic plug 20 comprises: a ferrule 21 in which the optical fiber 1 is being fixed; a tubular member 22 fixed on the rear end portion of the ferrule 21, having brim portions 22A and recess portions 22B (i.e., the brim portion 22A is an uppermost edge of the recess portion 22B); and a cylindrical tube 24 which is fitted on the tubular member 22 and is able to slide thereon in the axial direction. Thus the basic plug 20 holds and fixes a terminal 1A (FIG. 2) of the optical fiber cable 1 in the rear end of the cylindrical tube 24 by covering the rear end of the cylindrical tube 24 with a tensile-strength member 210 (FIG. 2), followed by bounding them together or cramping a tubular member 215 on the covered portion. It is noted that the ferrule 21 has at least one common dimensional structure for adapting to various kinds of connectors.

There is a spring coil 25 between the brim portion 22A of the tubular member 22 and the cylindrical tube 24 to forcefully keep them separated by its spring tension. That is, the tubular member 22 and the ferrule 21 is constructed as a spring-floating structure in which they are spring-loaded toward a front end of the ferrule 21 with respect to the cylindrical tube 24.

To be more specific in the present embodiment, a cylindrical portion 22B is integrally formed on the rear end portion of the brim portion 22A of the tubular member 22 and extended along the lengthwise direction of the cylindrical tube 24. An outer peripheral surface of the rear end portion of the cylindrical portion 22B has protrusions 22C which are formed so as to be flexibly distorted inwardly along the diameter of the cylindrical portion 22B. In the front end portion of the cylindrical tube 24, there are formed square openings 213 into which the respective protrusions 22C are inserted with a space enough to slide along the length width direction of the cylindrical tube 24. If the tubular member 22 moves forward with respect to the cylindrical tube 24, its movement is restricted by contact between the protrusion 22C and a front side of the square opening 213.

In a state of being free, the contact between the protrusion 22C and the front side of the square opening 213 is maintained by pushing the tubular member 22 forward by an extending force of the spring coil 25. If the tubular member 22 is forcefully pushed backward against the extending force of the spring coil 25, the protrusion 22C can slide along its axial direction in the opening 213 to shift the position of the ferrule 21 with respect to the cylindrical tube 24.

In the present configuration, the movement of the ferrule 21 against the extending force of the spring coil 25 is limited by contacting the protrusion 22C with the rear side of the square opening 213. Alternatively, the restriction of an amount of the movement may be performed by forming an additional member around the cylindrical portion 22B for restricting the movement and contact the additional member with the opening's side portion of the cylindrical tube 24. The additional member for restricting the movement may be, for example, selected from protrusion formed around a peripheral surface of the cylindrical portion 22B, a short cylinder formed between the long cylindrical portion 22B and the spring coil 25, and the like.

A spring-loaded engagement piece 27 is integrally formed on the other end (i.e., the rear end) portion of the cylindrical tube 24 and comprises a tongued strip 27A provided by forming a U-shaped slit 26 in the peripheral surface of the cylindrical tube 24 and an engagement protrusion 27B formed and extended on a free end of the tongued strip 27A. Therefore, the engagement protrusion 27B on that free end can be displaced in the outward or inward direction by an effect of elastic deformation of the tongued strip 27A. In this embodiment, there are two tongued strips 27A spaced-apart 180 degrees in a circumferential direction of the cylindrical tube 24.

The engagement protrusion 27B has a wedge-shape and the thickness thereof is gradually increased toward an opposite end thereof, resulting in a substantial protrusion through the peripheral surface of the cylindrical tube 24. If the basic plug 20 is gradually inserted into the plug housing 30 through the insert end portion 34, the engagement protrusion 27B contacts with an inner edge of the insert end portion 34 and is gradually pushed into the cylindrical tube 24 at the time of passing the engagement protrusion 27B through the insert end portion 34. Then the engagement protrusion 27B is engaged into the engaging slot 35 by recovering its original state by the elasticity of the tongue piece 27A when the engagement protrusion 27B faces one of the engaging slots 35. In this state, the basic plug 20 is coupled to the FC plug housing 30.

In addition, a rectangular protruded region 211 is formed on an outer peripheral surface of the cylindrical tubular 24, with 90 degrees deviation from the engagement protrusion 27B along the circumferential direction of the cylindrical tube 24, while a groove 214 to be matched with that protruded region 211 is formed in an inner surface of the FC plug housing 30. As shown in the figure, there is a gradual decrease in thickness of a front end portion (i.e., formed as a tapered portion) of the protruded region 211 to smooth the path to engage with the groove 214. Thus, inserting the basic plug 20 into the FC plug housing 30 lead sot mate the groove 214 and the protruded region 211 together, resulting in restrictions on the relative turns of the basic plug 20 and the FC plug housing 30 in the directions of their circumferences, respectively.

For the step of inserting the basic plug 20 into the insert end portion 34 of the FC plug housing 30, each structural element is designed to have predetermined dimensions so that the brim portion 22A comes into contact with a flange 31A (FIG. 2) in an inward direction of the mating member 31 prior to engagement of the engagement protrusion 27B with the engaging slot 35. Thus the spring coil 25 is being compressed when the engagement protrusion 27B in engaged in any engaging slot 35. If the mating member 31 and the cylindrical tube 24 are coupled together by engaging the engagement protrusion 27B into the engaging slot 35, an extending force of the spring coil 25 pushes the ferrule 21 against the flange 31A, and subsequently the ferrule 21 is fixed into the flange 31A and then housed therein. Namely, the FC plug housing and the basic plug 20 are in a state of established assembly.

For canceling the assembly state, th engaging protrusion 27B is forcefully pushed down against an elastic force of the tongued strip 27A that tends to push it up to release the engagement between the engagement protrusion 27B and the engaging slot 35, resulting that the cylindrical tube 24 is removed quickly from the mating member 31 by an extending force of the spring coil 25, resulting in a release from the assembly state.

The process of adjusting the center of the key ring 33 and the direction of eccentricity of the fiber core so that they are in proper relative position can be attained by positioning the engagement protrusion 27B relative to the mating member 31 in a circumferential direction. More specifically, for the alignment to lead them in the right place, a plurality of grooves 22D are formed in an outer peripheral surface of the brim portion 22A and also a plurality of keys 31B (FIG. 2) to be fit into their respective grooves 22D are protruded from an inner surface of the mating member 31, configuring so-called directional coupling key elements. Therefore, the best relative position of the key ring 33 and the direction of core eccentricity can be adjusted by shifting a phase of fitting the key 31B into the groove 22B by turning them relatively in a circumferential direction.

The cylindrical tube 24 may be integrally formed by an injection molding press. For this process, it is preferable to use polyetherimide, glass-fiber reinforced plastic thereof, polybutyl terephthalate, or glass-fiber reinforced plastic thereof as a material in terms of its strength.

Figure 3:
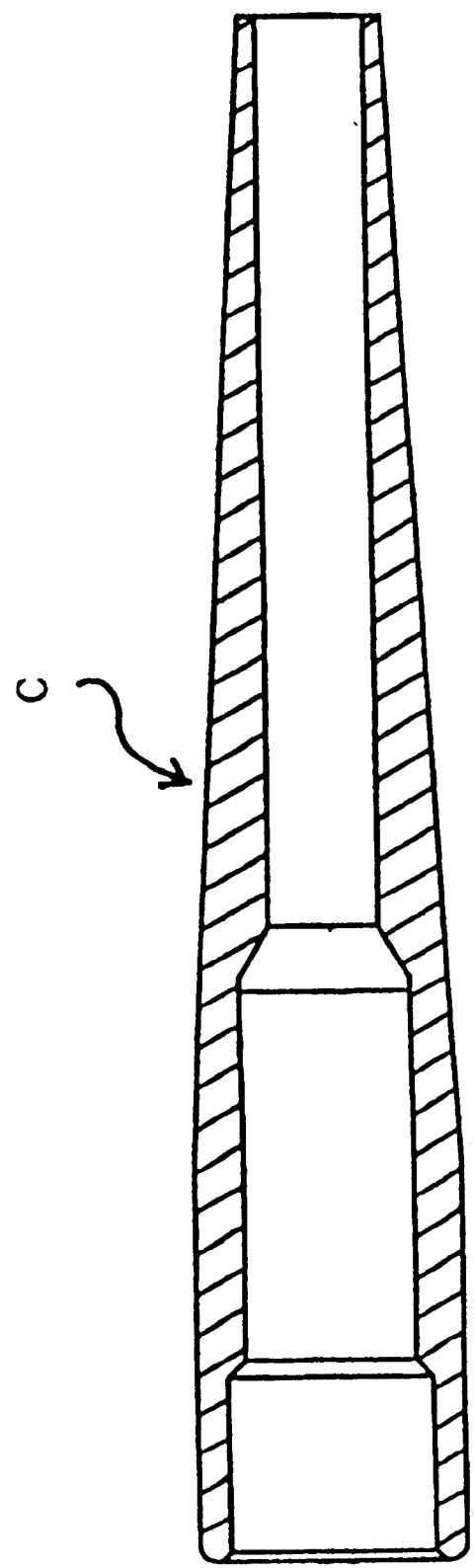
FIG. 3 is a cross sectional view of a hood used in the universal optical fiber connector in accordance with the present invention.

As described above, the universal optical fiber connector 10 shown in FIG. 1 is able to construct a FC-type optical fiber connector assembly designed to connect directly to the corresponding FC-type optical fiber connector assembly by fitting and holding the basic plug 20 in the FC plug housing 30. As a mater of fact, the rear end of the assembled universal optical fiber connector 10 may be covered with a hood C as shown in FIG. 3 for protecting the connection from external forces including bending stress and twisting stress of the optical fiber cable.

Embodiment 2

Figure 4:
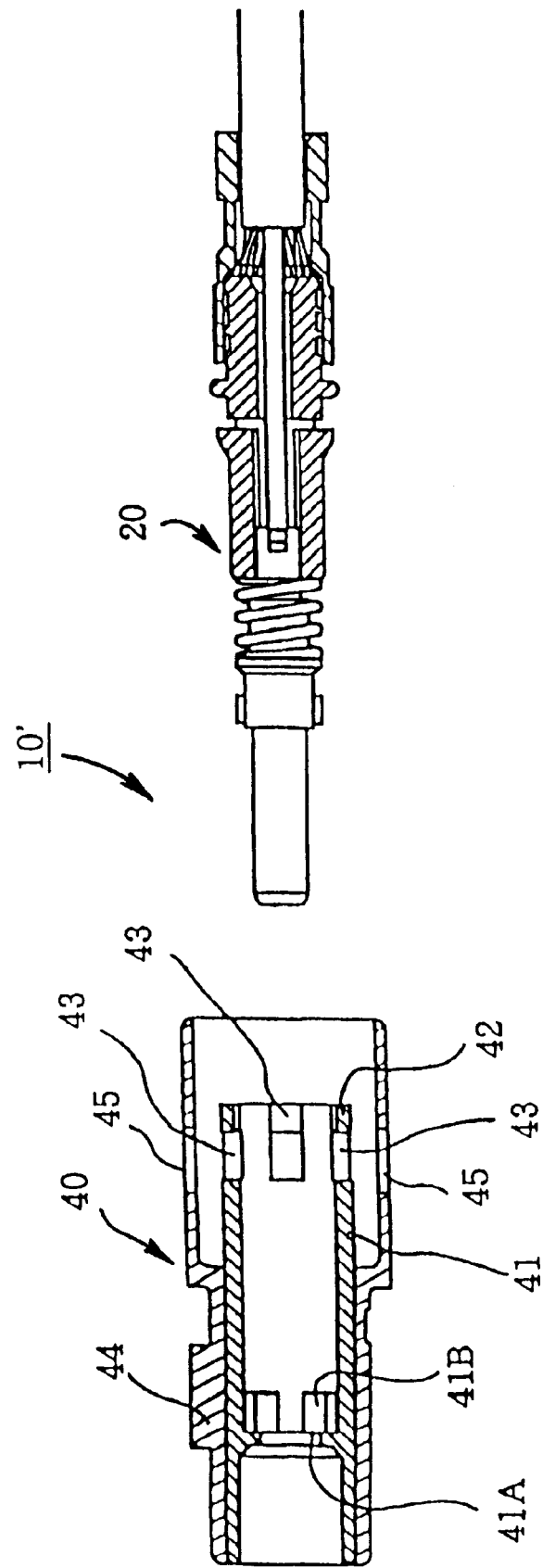
FIG. 4 is a perspective view of a universal optical fiber connector as a second embodiment of the present invention.

FIG. 4 shows a cross sectional view of an optical fiber connector 10' in the type of SC, where the basic plug 20 is the same one as that of shown in FIGS. 1 and 2, comprising a SC plug housing 40 for connecting the basic plug 20 to the SC-type optical fiber connector different from the type FC.

The SC plug housing 40 has a mating member 41 with the same configuration as that of the mating member 31 shown in FIG. 2. Near a ferrule-insert end 42 of the mating member 41, there are a plurality of engaging slots 43 spaced every 90 degrees along a circumferential direction of that end 42. On an outer peripheral portion of the mating member 41, a push and pull tightening member 44 for the FC-type optical fiber connector is installed. The push and pull tightening member 44 has windows 45 at their respective positions facing to engaging slots 43, respectively. Therefore, it is possible to release the engagement between the engagement protrusions 27B and the engaging slots 43 through the windows 45. In the figure, furthermore, the reference numeral 41A indicates a flange in an inward direction corresponding to the flange 31A in an inward direction, and also the reference numeral 41B indicates a key corresponding to the key 31B.

Using the SC plug housing 40 instead of the FC plug housing 30, consequently, the SC-type optical fiber connector 10' can be constructed by simply inserting the basic plug 20 into the SC plug housing 40.

Embodiment 3

Figure 5:
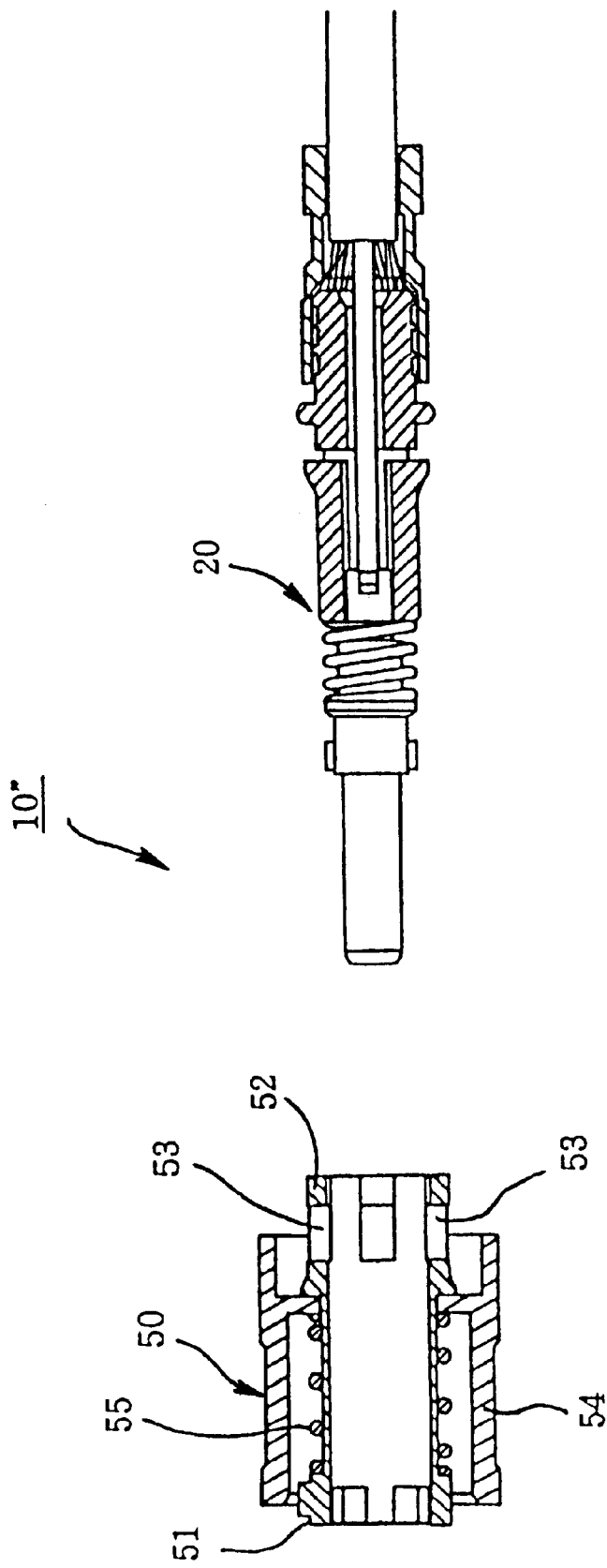
FIG. 5 is a perspective view of a universal optical fiber connector as a third embodiment of the present invention.

Referring now to FIG. 5, there is shown a ST plug housing 50 in addition to the basic plug 20 having the same configuration as those of shown in FIGS. 2 and 4, combining the ST plug housing with the basic plug 20 to provide an optical fiber connector 10" in the type of ST.

The ST plug housing 50 has a mating member 51 which is constructed as the same structure as that of the mating member 31 in FIG. 2. In the proximity of a ferrule-inserting portion 52 of the mating member 51, engaging slots 53 are formed with a 90 degrees spacing in a circumferential direction of the mating member 51. A bayonet fastening member 54 for the ST type optical fiber connector is fitted on an outer peripheral surface of the mating member 51. The bayonet fastening member 54 is slideably supported on the mating member 51 and pressed rightward in FIG. 5 by a spring 55 arranged between the bayonet fastening member 54 and the mating member 51.

Using the ST plug 50 instead of the FC plug housing 30 in this way, the ST type optical fiber connector 10" can be constructed only by fitting the basic plug 20 into the ST plug housing 50.

Using the SC plug housing 40 or the ST plug housing, just as in the case of the FC plug housing 30, the basic plug 20 may be easily fitted in place or detached with a single motion.

Figure 6:
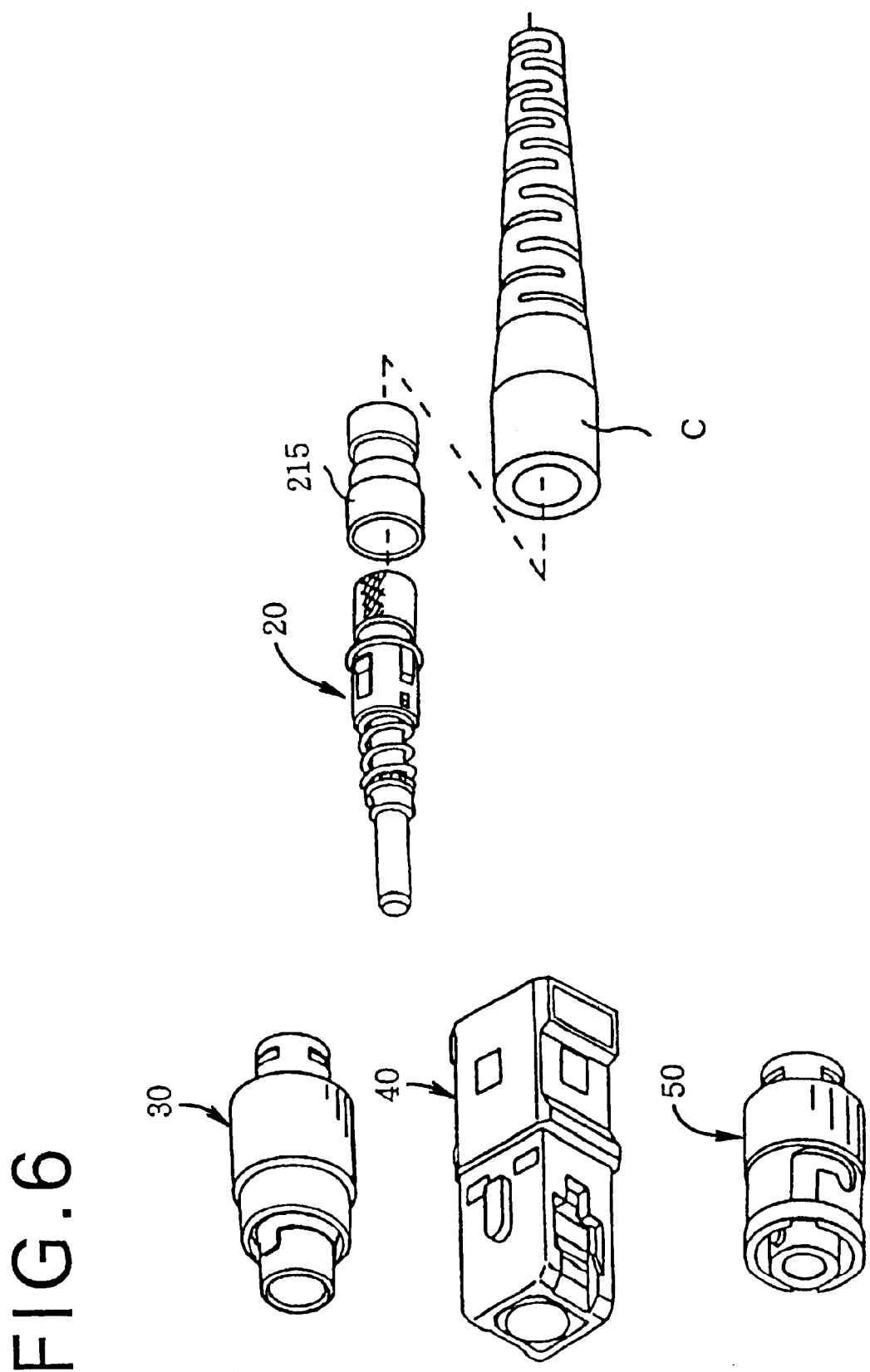
FIG. 6 is a perspective view that illustrates a system configuration of the optical fiber connector in accordance with the present invention.

As can be seen from the above description, and also as described below with reference to FIG. 6, any desired optical fiber connector of the type of FC, SC, or ST can be easily assembly or easily replaced with the other type optical fiber connector by any combination of the basic plug 20 with one selected from the FC plug housing 30, the SC plug housing 40, and the ST plug housing 50 if these components are prepared in advance. As a consequence, a universal optical fiber connector is capable of coupling to another optical fiber connector of any type.

Simultaneously, it is easy to find an appropriate position of the key ring of adjusting its position in the direction of eccentricity of the fiber core. For this purpose, grooves are formed on both ends of the adapter to engage the positioning keys of both optical fiber connectors, respectively, so that the adjusted optical fiber connector can be arranged face to face in a straight line at the time of lining them up by the engagement, resulting in a stable connection between them without causing their substantial axial deviations between the fiber cores in opposite directions.

In this embodiment, the connection between one single fiber and the other single fiber (i.e., between single ferrules) is described but not limited to such connection. It is also possible to apply to other connector forms with the same effects, such as a multiple optical fiber connector assembly in which a plurality of single optical fiber connectors are connected face to face as a single unit.

In this embodiment, furthermore, the description has been made on the cases of applying on the optical fiber connector in the type of FC, SC, ST, or the like, but is not limited thereto. Without relying on already-existing optical fiber connectors, it is also possible to use an adapter housing newly prepared for the basic plug of the present embodiment, resulting that the connection between the optical fiber cables can be easily performed without restraint. Hereinafter, therefore, we will describe other embodiment of the present invention without depending on already-existing optical fiber connectors.

Embodiment 4

Figure 7:
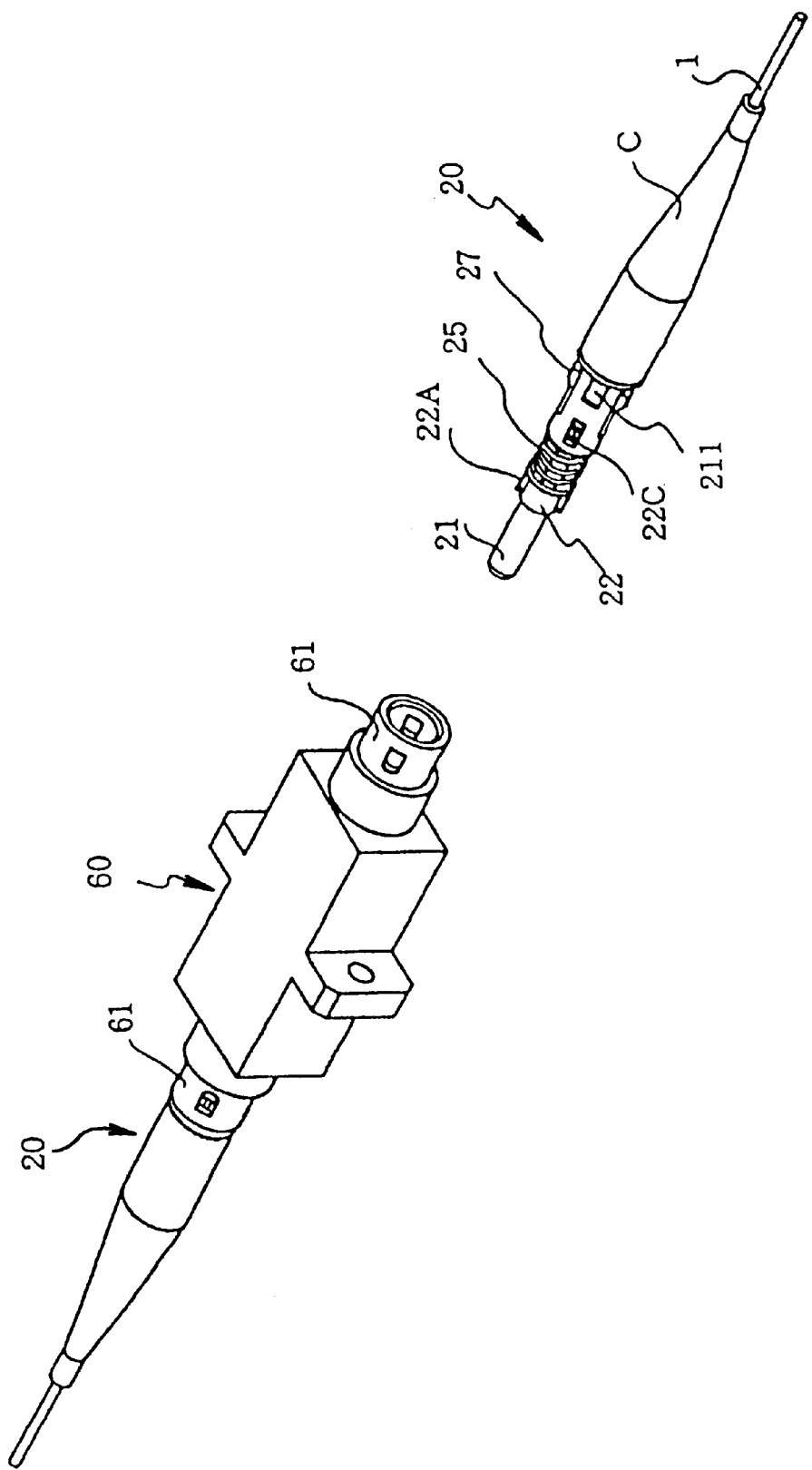
FIG. 7 is a perspective view of a universal optical fiber connector as a fourth embodiment of the present invention.
Figure 8:
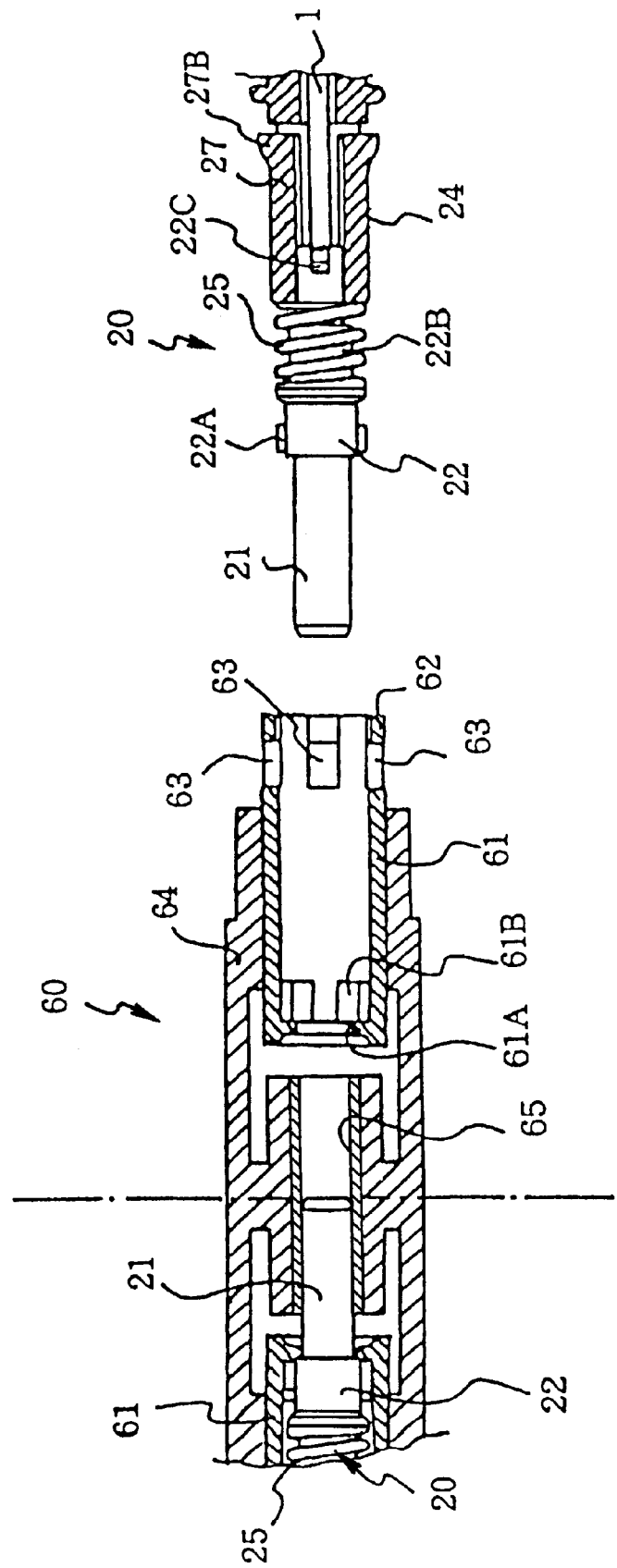
FIG. 8 is a cross sectional view of a main part of the universal optical fiber connector as the fourth embodiment of the present invention.

FIG. 7 is a schematic perspective view showing an optical fiber connector as one of the embodiment of the present invention and FIG. 8 is a longitudinal cross section of a main part of the optical fiber connector shown in FIG. 7.

The present embodiment is designed to directly connect the basic plug 20 to the adapter housing without using any plug housing. In this embodiment, the basic plug 20 is the same one as that of FIG. 2. As shown in FIGS. 7 and 8, the adapter 60 is responsible for holding the coaxially-opposed basic plugs 20 on both sides thereof to connect optical fibers 1 in these plugs 20. For that purpose, the adapter housing 60 comprises a pair of mating members 61 being constructed as the same structure as that of the mating member 31 shown in FIG. 2, and a sleeve 65 such as a separate sleeve on which a ferrule 21 can be fixed is embedded in the center portion between the mating members 61.

At one end of the mating member 61 facing to the basic plug 20, there is a ferrule-inserting portion 62 where four engaging slots 63 are spaced 90 degrees in its circumferential direction. On the other side of the mating member 61, there are a flange 61A and a key 61B which correspond to the flange 31A in an inward direction and the key 31B, respectively, in FIG. 2. As shown in the figure, a casing 64 coaxially holds the opposed mating members 61, and also it coaxially holds the sleeve 65 between the mating members 61.

Therefore, an optical connection between the bare optical fiber 99 can be completed by inserting the basic plugs 20 that hold the optical cables 1 into their respective mating members 61 of adapter housing 60 to engage the engagement protrusion 27B and the engage slot 63 and to fit a tip of the ferrule 21 into the sleeve 62 in the right place.

According to the present embodiment, a configuration of the connection is more simple than those of using optical fiber connectors in the types of FC, SC, ST, and so on, so that the number of elements to be requires can be reduced and its manufacture cost can be also reduced.

Using the basic plug 20, therefore, it is possible to cope with a wide variety of available optical fiber connectors or the like by using members appropriate for the available members including FC plug housing 30, SC plug housing 40, and ST plug housing 50 and to make a simple connector structure by reducing the number of structural elements.

Embodiment 5

In the above embodiment shown in FIGS. 7 and 8, the optical connection between two single optical fibers is described in detail. However, the optical connection using the basic plug 20 is not limited to such arrangement. As a mater of course, the present invention may be applied on a multiple optical connection among a plurality of connectors in which they are oppositely coupled together to obtain the same effects.

Figure 9:
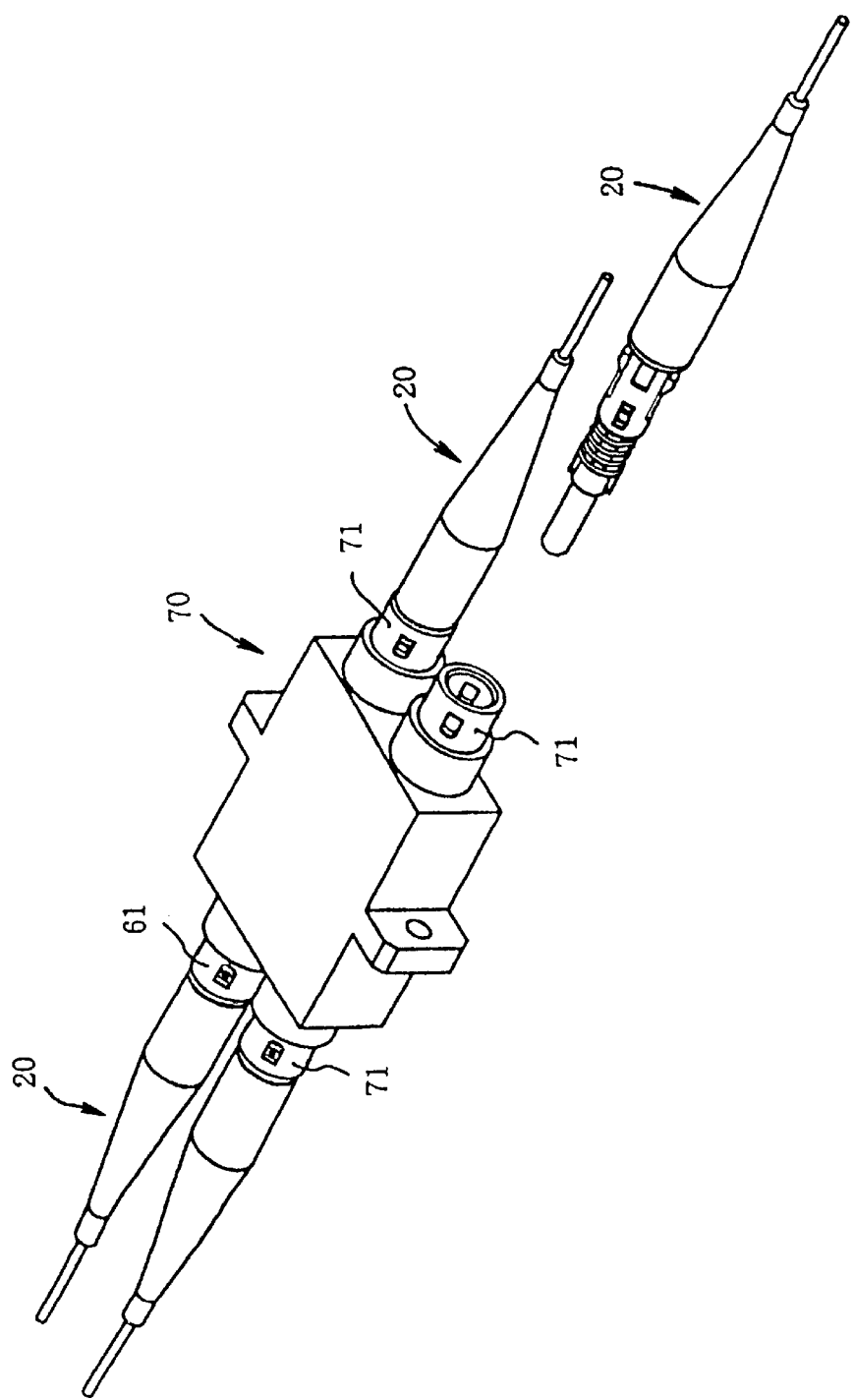
FIG. 9 is a perspective view of a universal optical fiber connector as a fifth embodiment of the present invention.
Figure 10:
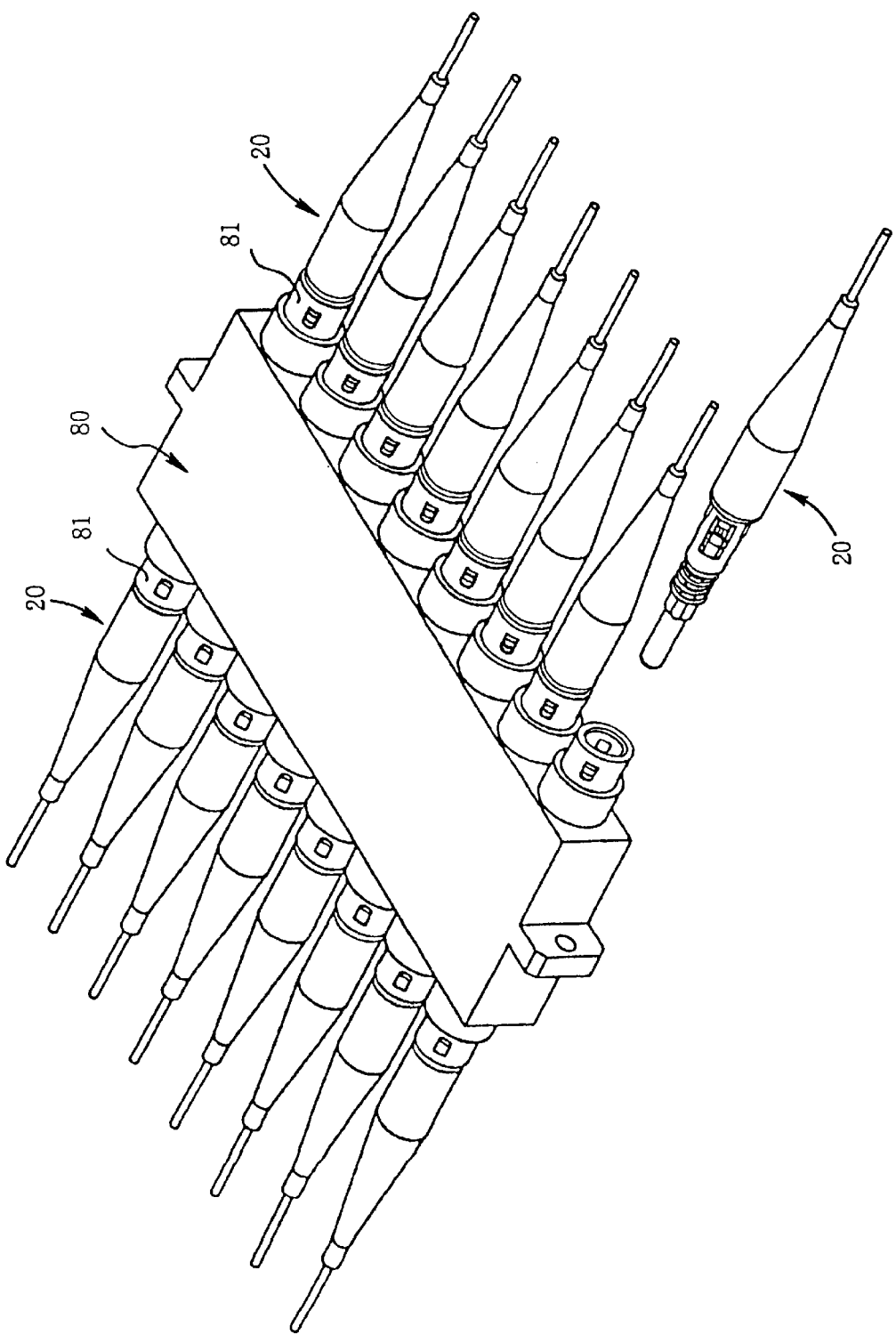
FIG. 10 is a perspective view of a universal optical fiber connector as another example of the fifth embodiment of the present invention.

FIG. 9 is a perspective view showing a duplex optical fiber connector for connecting four optical fiber cables at the same time to make two pairs of connected optical fibers. As shown in the figure, a duplex adapter housing 70 comprises two pairs of mating members 71, so that two mating members 72 are arranged on one side of the duplex adapter housing 70. Thus the basic plugs 20 can be fixed into the mating members 71 from both ends of the duplex adapter housing 70, resulting in two pairs of connected optical fiber cables through the respective pairs of the mating members 71. In addition, FIG. 10 is a perspective view showing an octuplex optical fiber connector for connecting sixteen optical fiber cables at the same time to make eight pairs of connected optical fibers. As shown in the figure, an octuplex adapter housing 80 comprises eight pairs of mating members 71, so that eight mating members 81 are arranged on one side of the octuplex adapter housing 80. Thus the basic plugs 20 can be fixed into the mating members 81 from both ends of the octuplex adapter housing 80, resulting in eight pairs of connected optical fiber cables through the respective pairs of the mating members 81. Consequently, a connection structure can be simplified by using the basic plug 20, allowing reduction in the number of elements and the assembly at low cost.

Embodiment 6

Figure 11:
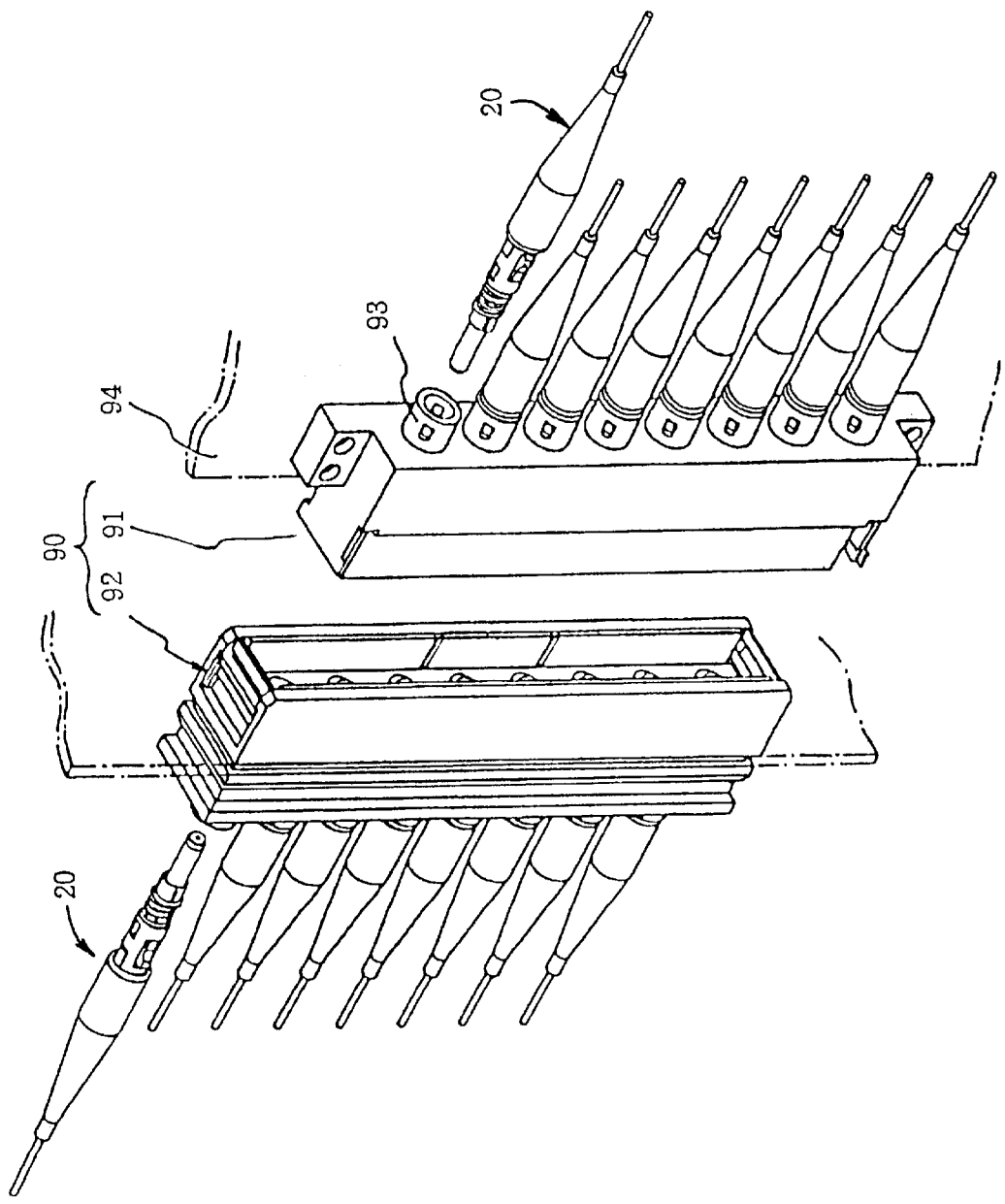
FIG. 11 is a perspective view of a universal optical fiber connector as a sixth embodiment of the present invention.

Furthermore, FIG. 11 is a perspective view showing another embodiment of the present invention. A shown in the figure, an adapter housing 90 comprises two separate members, namely a male adapter housing 91 for basic plugs and a female adapter housing 92 for basic plugs to be mated together in a removable manner, in which each member has eight mating members 93 for receiving the basic plugs 20. According to the present embodiment, for example, the male adapter housing 91 may be fixed on a panel, so that eight optical fiber cables arranged in the female adapter housing may be simultaneously connected to eight optical fiber cables arranged in the male adapter housing 92 with plug-in ease of use.

While the optical fiber connectors have been described in Embodiments 1–6 with reference to the drawings, such description are for illustrative purposes only, and it is to be understood that changes and variations may be made without departing from the spirit or scope of the attached claims.

According to Embodiments 1–6 of the present invention, as described above, the form of optical fiber connector can be easily changed by a simple operation. Therefore, it is possible to connect any optical fibers by changing a plug housing while maintaining the basic plug as is, resulting in high utility in the optical connections. In addition, it is less expensive than using a converging adapter, and also there are no drawbacks such as a transmission loss. Furthermore, it is possible to optimally adjust the position of the key ring, so that the optical fiber connector can be much more sophisticated.

Furthermore, the basic plug of the present invention can be used as is. In this case, therefore, the connection structure can be simplified by using an adapter, so that the number of elements to be required can be reduced and its manufacturing cost can be also reduced.

Embodiment 7

Figure 12:
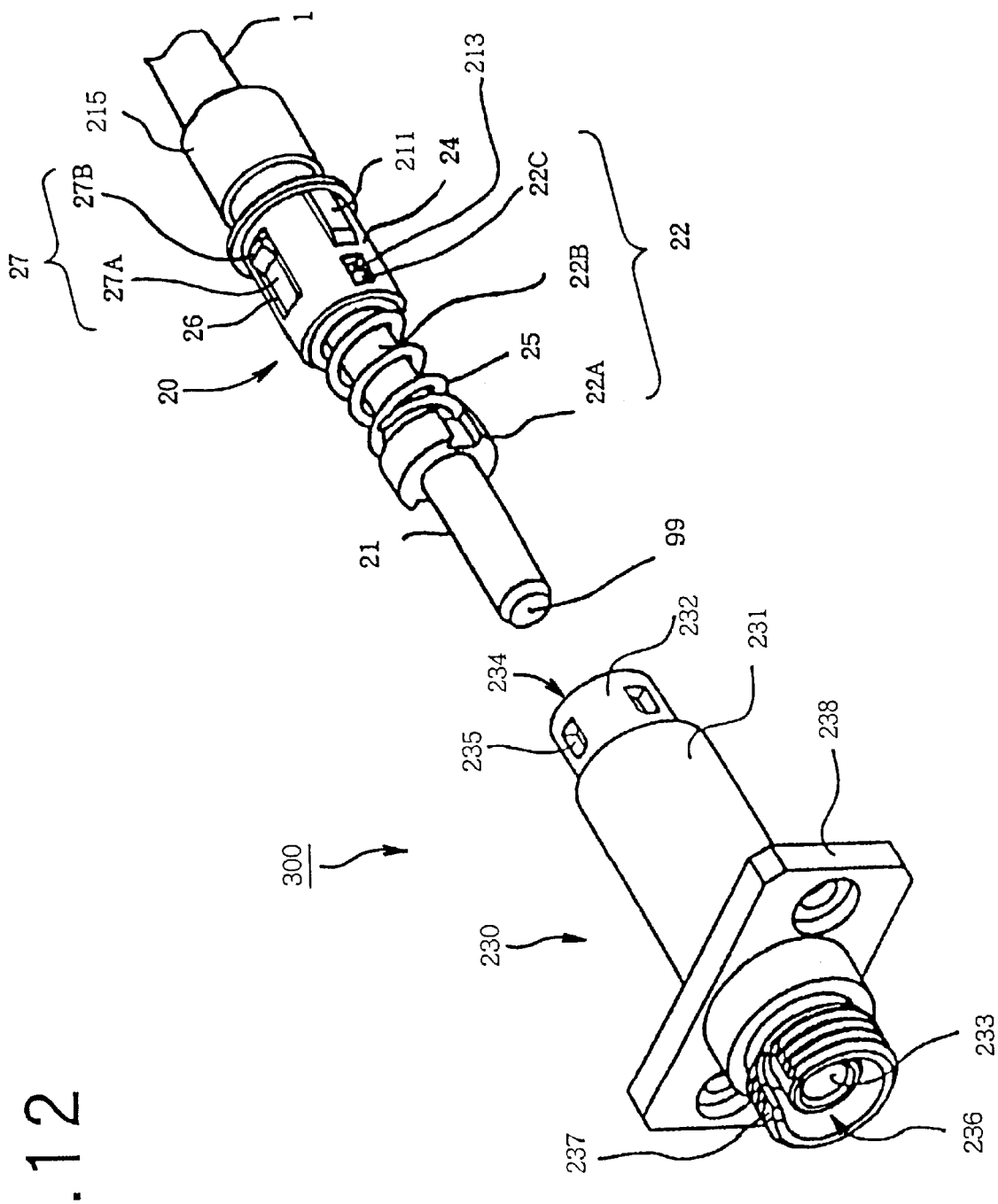
FIG. 12 is a perspective view of a universal optical fiber connector as a seventh embodiment of the present invention.
Figure 13:
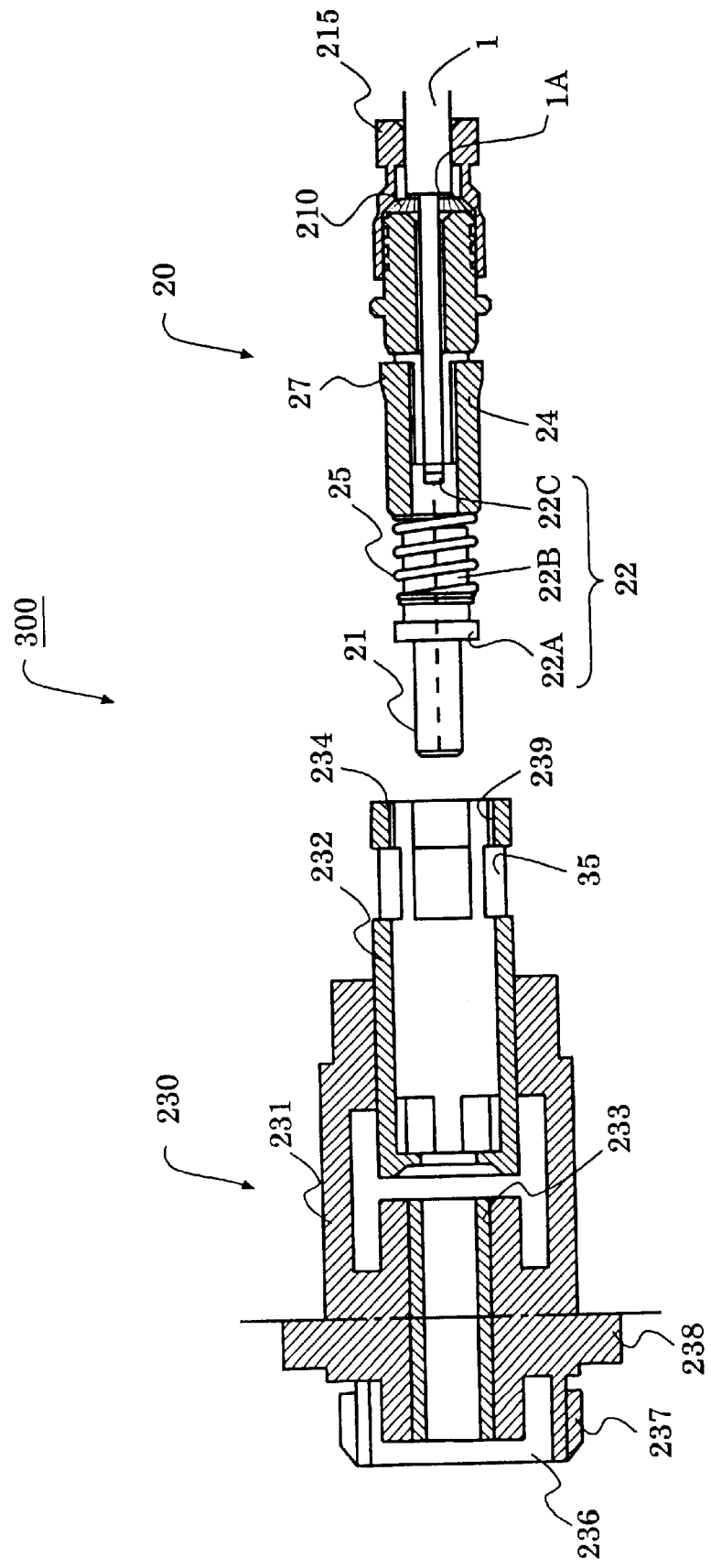
FIG. 13 is a cross sectional view of the universal optical fiber connector as the seventh embodiment of the present invention.

FIG. 12 is an exploded perspective view of a universal optical fiber connector as one of the embodiments of the present invention, while FIG. 13 is a cross-sectional view of FIG. 12.

A universal optical fiber connector 300 shown in FIGS. 12 and 13 is in the type of FC. The optical fiber connector 300 comprises a basic plug 20 and a FC jack housing 230 for holding the basic plug 20 having the same construction shown in FIG. 1.

The jack housing 230 comprises a cylindrical-shaped casing 231, a mating member 232 which is coaxially fixed in one end portion of the casing 231, and sleeve 233 such as a separate sleeve for fitting to a ferrule 21, which is coaxially fixed in the other end portion of the casing 231. Thus, the jack housing 230 is responsible for fitting a basic plug 20 into a ferrule-inserting portion 234 and fitting a FC plug into an opposite end portion to make an optical connection by coaxially holding a bare fiber 99 of the basic plug 20 and an optical fiber of the FC plug in an opposite manner.

Furthermore, there are four engaging slots 235 formed in proximity to the ferrule-inserting portion 234 of the mating member 232 and spaced every 90 degrees along a circumferential direction thereof. In addition, an inner surface of an engaging slot region of the ferrule-inserting portion has grooves 239 in which protrusions 211 of the basic plug 20 are engaged. If the basic plug 20 is inserted into the FC jack housing 230, protrusions 211 are fitted in the grooves 239 (FIG. 3) to limit the relative rotation between the basic plug 20 and the FC jack housing 230 in a circumferential direction.

On the other end of the casing 231, a FC plug inserting portion 236 is formed to engage the conventional FC plug 100 as shown in FIG. 24. The FC plug inserting portion 236 has a male thread portion 237 on its outer peripheral surface and is shaped so as to be able to receive the FC plug. Therefore, if the FC plug 100 is inserted into the FC plug inserting portion 236, the male thread portion 237 formed on the other peripheral surface of the casing 231 and the female thread formed in an inner peripheral surface of the a tightening member 103 of the FC plug are tightened together, following by inserting a tip of the ferrule 101 of the FC plug 100 into the sleeve 233 and contacting it to the ferrule 21 of the basic plug 20 to make an optical connection between the optical fibers.

For fixing the casing 231 on a fixing member such as a panel, a flange portion 238 is provided on an outer peripheral surface of the casing 231 at a region near the center of the casing 231 in its axial direction.

According to the present embodiment, it is possible to connect the basic plug 20 on one side of the jack housing 230 and to connect the FC-typed plug on the other side thereof. Thus, the optical connection can be performed without preparing any one of the various conventional adapter. In addition, for example, if jack housing that support the conventional plugs in the types of FC, SC, ST, and so on, respectively, there is no need to prepare various kind of conversion adapters, realizing the connection structures with various optical fiber connectors. Therefore, the number of the structure elements and the manufacturing costs can be attained.

Figure 14:
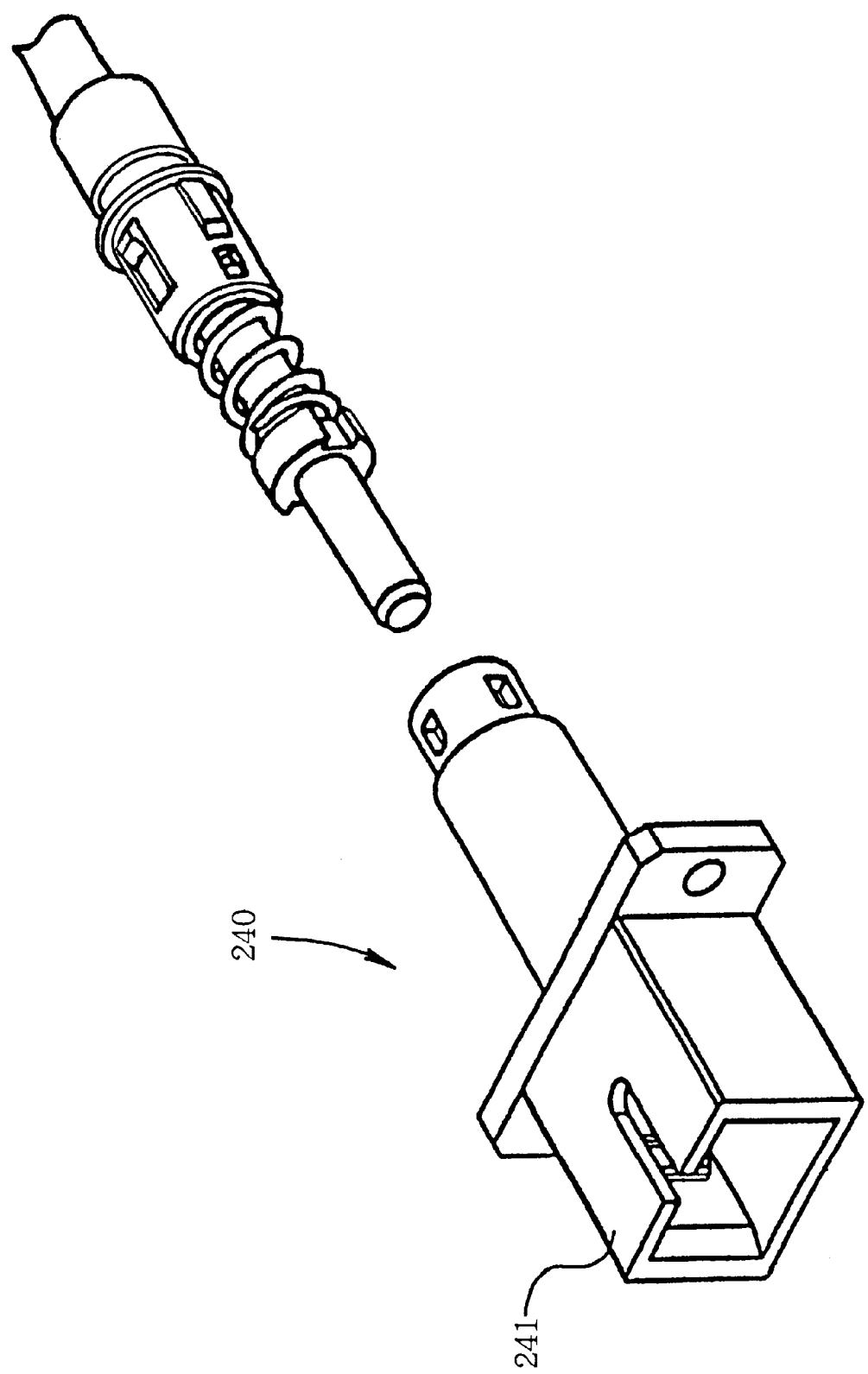
FIG. 14 is a perspective view of a universal optical fiber connector as another example of the seventh embodiment of the present invention.
Figure 15:
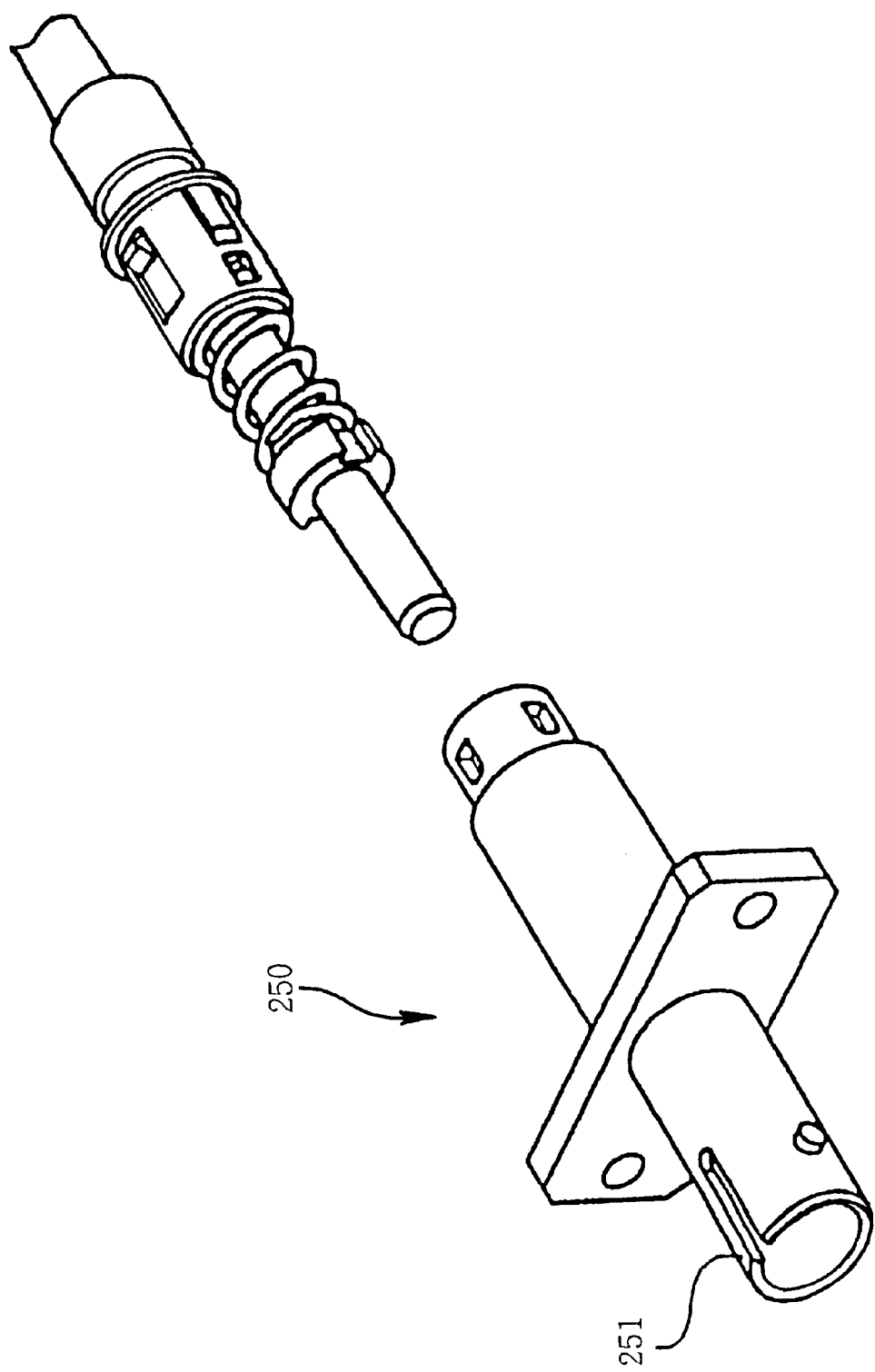
FIG. 15 is a perspective view of a universal optical fiber connector as still another example of the seventh embodiment of the present invention.

As shown in FIG. 14, for example, a plug-coupling member 241 may be provided to connect the SC plug to the plug-inserting side of the jack housing 240. As shown in FIG. 15, furthermore, a ST coupling member 51 may be provide dot the plug-inserting side of the jack housing 250 for connecting the ST plug. In this embodiment, each of these jack housing 240 and 250 ha the same structure as those shown in FIGS. 12 and 13 on its side of connecting the basic plugs. In the present embodiment, in addition, FC, SC, and ST type plugs are exemplified but is not limited thereto. It is also possible to adapt to another type such as a MU type optical fiber connector.

In all of the embodiments, it is understood that the flange portion is provided on the jack housing, but not limited thereto. The jack housing may be constructed without any flange portion.

In the present embodiment, the optical connection described above using any optical fiber connector is in the type of connecting two single optical fibers or single ferrules. However, it is not limited thereof. The present embodiment may be applied on a multiple connector assembly in which a plurality of single connectors are provided as a set of oppositely coupled single connectors, resulting in the same effects as that of the connection between two single optical fibers.

According to Embodiment 7 of the present invention, as described above, various connection structures can be obtained very easily, as the optical fiber connector comprising an adapter has one end for directly connecting a common basic plug and the other end for connecting various connector types of plug. In addition, the present embodiment has the effect of enabling a change of types of various optical fiber connectors by a very simple configuration. For example, a combination of different optical fiber connectors can be included in the optical connection assembly that enables a connection between any optical fibers by just replacing the jack housing while using the basic plug as it is, so that it is less expensive as compared with the case of using a converting adapter, and also it does not cause any drawbacks such as a transmission loss.

Using the optical fiber connector the present invention, furthermore, the basic plug of the present invention can be used just as it is. In this case, therefore, the connection structure can be applied on various conventional plugs, so that there is no need to replace the structural elements and its manufacturing cost can be also reduced.

Embodiment 8

Figure 16:
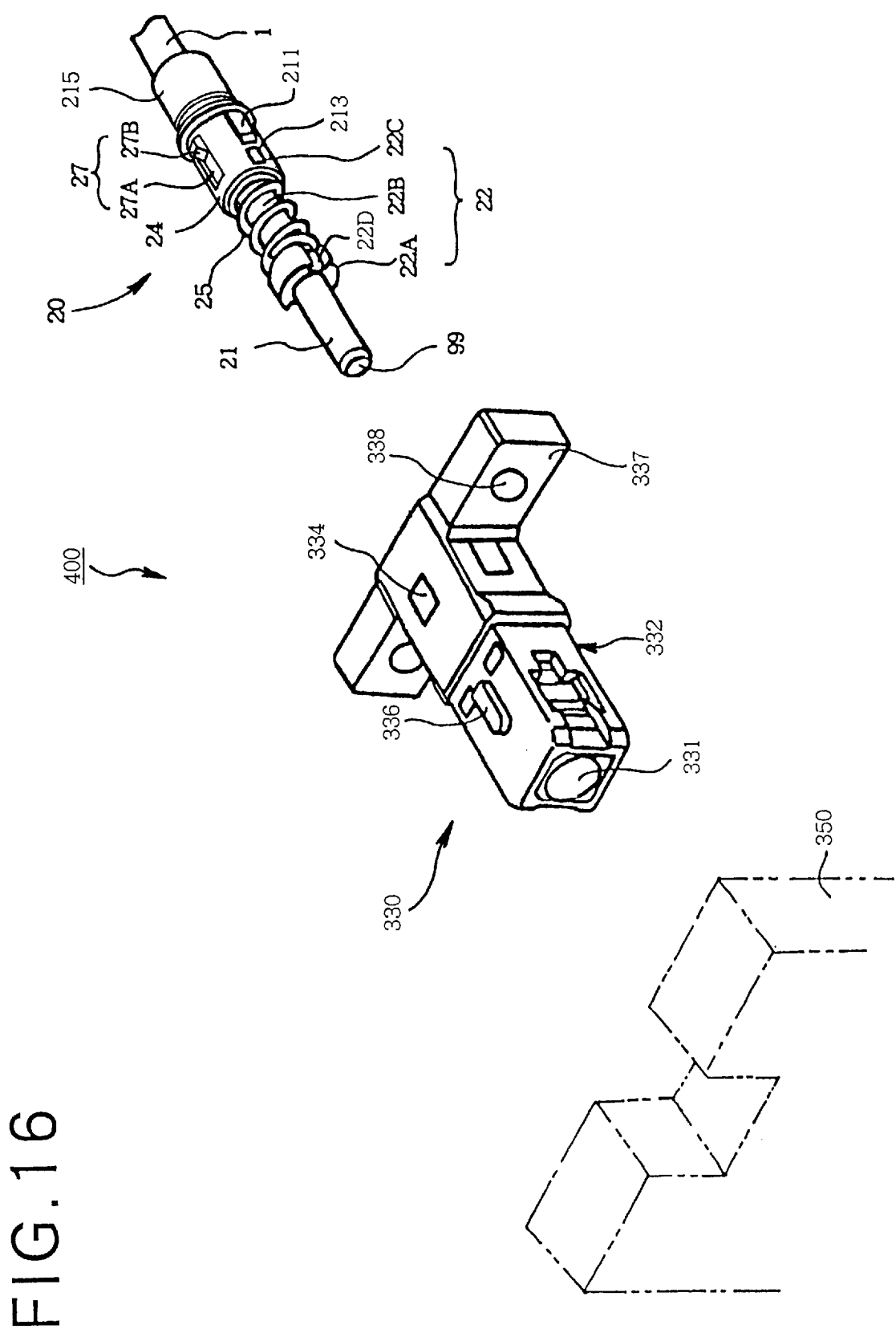
FIG. 16 is a perspective view of a universal optical fiber connector as an eight embodiment of the present invention.
Figure 17:
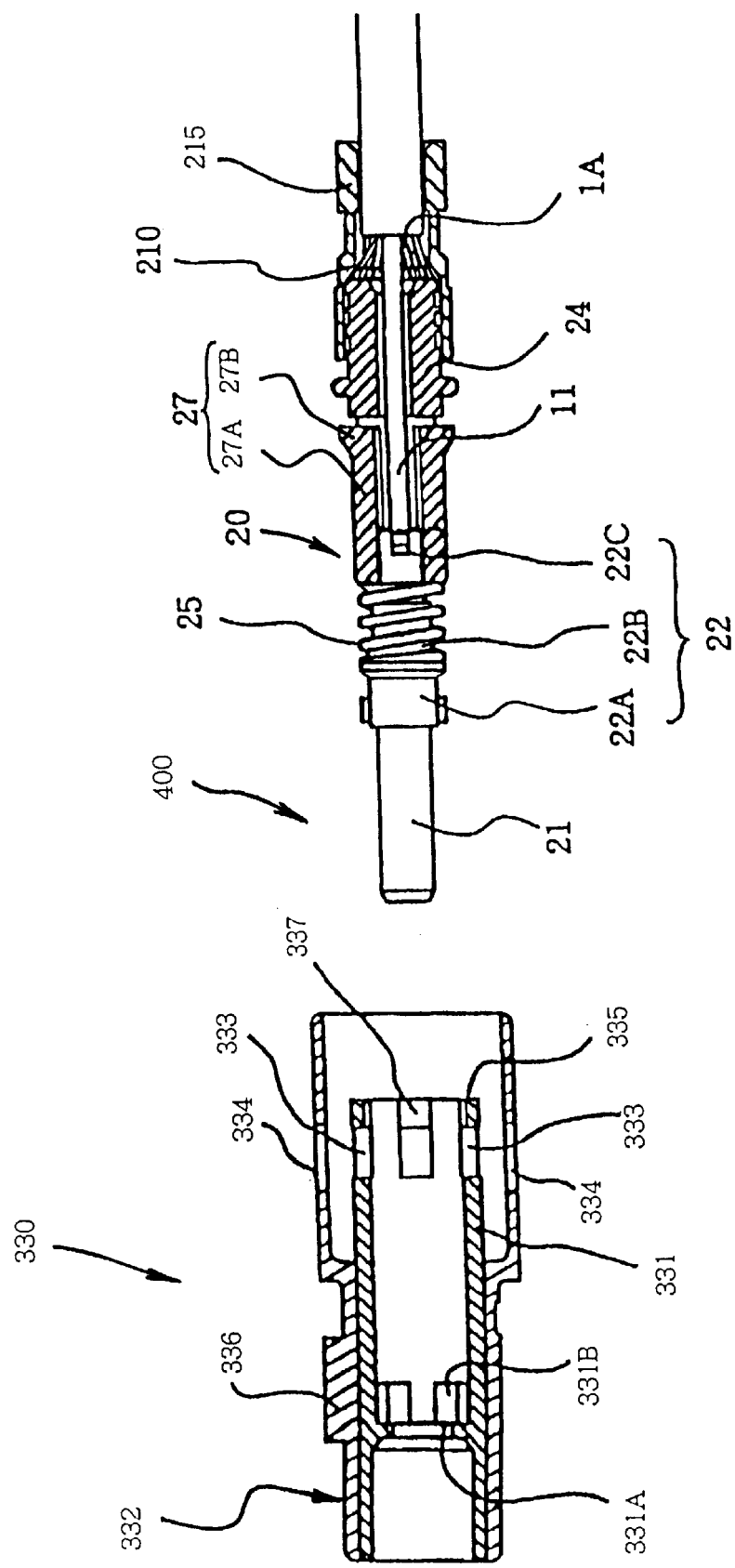
FIG. 17 is a cross sectional view of the universal optical fiber connector as an eighth embodiment of the present invention.

FIG. 16 is an exploded perspective view of a universal optical fiber connector as one of the embodiments of the present invention, while FIG. 17 is a cross-sectional view of FIG. 16.

A universal optical fiber connector 400 shown in FIG. 16 is in the type of SC. The optical fiber connector 400 comprises a basic plug 20 having the same construction as that shown in FIG. 1 and a SC plug housing 330 for holding the basic plug 20.

The SC plug housing 330 comprises a mating member 331 and a push and pull tightening member 332. Near a ferrule-insert end 335 (FIG. 17) of the mating member 331, there are a plurality of engaging slots 332 spaced every 90 degrees along a circumferential direction of ferrule-insert end 335.

On an outer peripheral portion of the mating member 331, a push and pull tightening member 332 for the SC type optical fiber connector is installed. They are fixed together by mean of adhesive or the like. The push and pull tightening member 332 has windows 334 at their respective positions facing engaging slots 333, respectively.

Therefore, the basic plug 20 and the SC plug housing 330 can be coupled under the following condition. That is, as a basic plug 20 is inserted through the ferrule-insert end 335 of the SC plug housing 330, the engagement protrusion 27B is contacted to an inner edge of the ferrule-insert end 335 of the engagement and forced into an inner side of the mating member 331 at the time of passing the engagement through the ferrule-insert end 335. On the other hand, the engagement protrusion 27B is engaged in the engaging slot 333 by returning to its original states by means of elasticity of the tongued strip 27A at the time of facing the engaging protrusion 27B to one of the engaging slots 333.

In addition, an inner peripheral surface of a region where the engaging slots 333 of the ferrule-inserting end 335 of the SC plug housing 330 are foremd has grooves 337 for engaging with the protrusions 211 (FIG. 16). If the basic plug 20 is inserted into the SC plug housing 330, protrusions 211 are fitted in the grooves 337 to limit the relative rotation between the basic plug 20 and the SC plug housing 330 in a circumferential direction.

In this embodiment, furthermore, the optical fiber connector has a predetermined dimension for contacting a brim portion 22A of a tubular member 22 with an inward flange 331A of the mating member 331 (FIG. 17) prior to engaging the engaging protrusion 27B into the engaging slot 333 at the time of inserting the basic plug 20 through the ferrule-insert end 335 of the SC plug housing 330. During the period of engaging the engaging protrusion 27B into any engaging slot 333, a spring coil 25 is kept in the contracted state. Therefore, when the mating member 331 and the cylindrical tube 24 are coupled together by engaging the engaging protrusion 27B into the engaging slot 333, the ferrule 21 is press-contacted to the inward flange 331A by a spring tension of the spring coil 25, and then fixed and held therein, resulting in a specified assembly of the SC plug housing 330 and the basic plug 20.

For canceling the assembly state, the engaging protrusion 27B is forcefully pushed down against an elastic force of the tongued strip 27A that tends to psuh it up to release the engagement between the engagement protrusion 27B and the engagement slot 27B, resulting that the cylindrical tube 24 is removed quickly from the mating member 331 by an extending force of the spring 25, resulting in a release from the assembly state.

The process of adjusting the center of the key ring 336 and the direction of the fiber core eccentricity so that they are in proper relative position can be attained by positioning the engagement protrusion 27B relative to the mating member 331 in a circumferential direction. More specifically, for the alignment to lead them in the right place, a plurality of grooves 22D (FIG. 16) are formed in an outer peripheral surface of the brim portion 22A and also a plurality of keys 31B (FIG. 17) to be fit into their respective grooves 22D are protruded from an inner surface of the mating member 331, configuring so-called directional coupling key elements. Therefore, the best relative position of the key ring 336 and the direction of core eccentricity can be adjusted by shifting a phase of fitting the key 331B into the groove 22D by turning them relatively in a circumferential direction.

Figure 18:
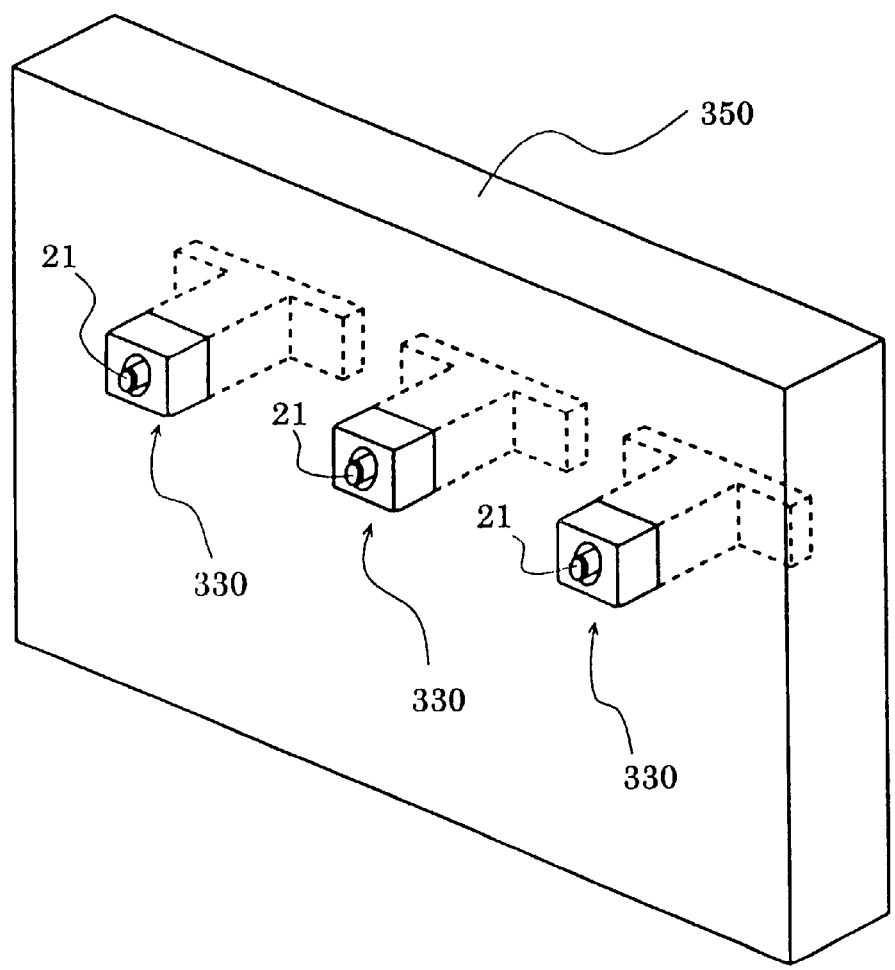
FIG. 18 is a perspective view that illustrates an example using the optical fiber connector of the eighth embodiment of the present invention.

An end of the push and pull tightening member 332 has two flange portions 337 formed on its end on the side of ferrule insertion. A through hole 338 is formed through a region near the center of each flange portion 337. The through hole 338 is responsible for the tightening using a screw. The flange 337 is responsible for fixing the SC plug housing 300 on a fixing member 350 such as a panel, and thus the plug can be fixed under the state of releasing an end face of the ferrule 21. Therefore, it is possible to clean the end surface of the ferrule 21. In addition, as shown in FIG. 18, it is possible to mount a plurality of the SC plug housing 330 on the fixing member 350. In this case, it is also possible to clean the end surface of the ferrule 21. Consequently, it brings efficiency to the operation of optical connection.

Furthermore, the flange portion 337 may be shaped into the same form as that of a flange portion of the already-existing adapter to avoid additional machining operation or the like on the fixing member and to fix the universal optical fiber connector 400 on the already-existing fixing member.

In the present embodiment, the plug housing is in the type of adapting to the shape of SC connector but not limited to that shape. Another plug housing to be adapted to one selected from various connector shapes, such a FC or ST connector or the like, may be used.

According to the optical fiber connector of the present embodiment 8, a tip of the ferrule can be positioned forward of the fixing member by means of the flange portion of the tightening member, so that a side face of the ferrule can be easily cleaned. In addition, we can provide an easy-to-clean optical fiber connector at low cost by shaping it into the same form as that of a flange portion of the already-existing adapter.

Embodiment 9

Figure 19:
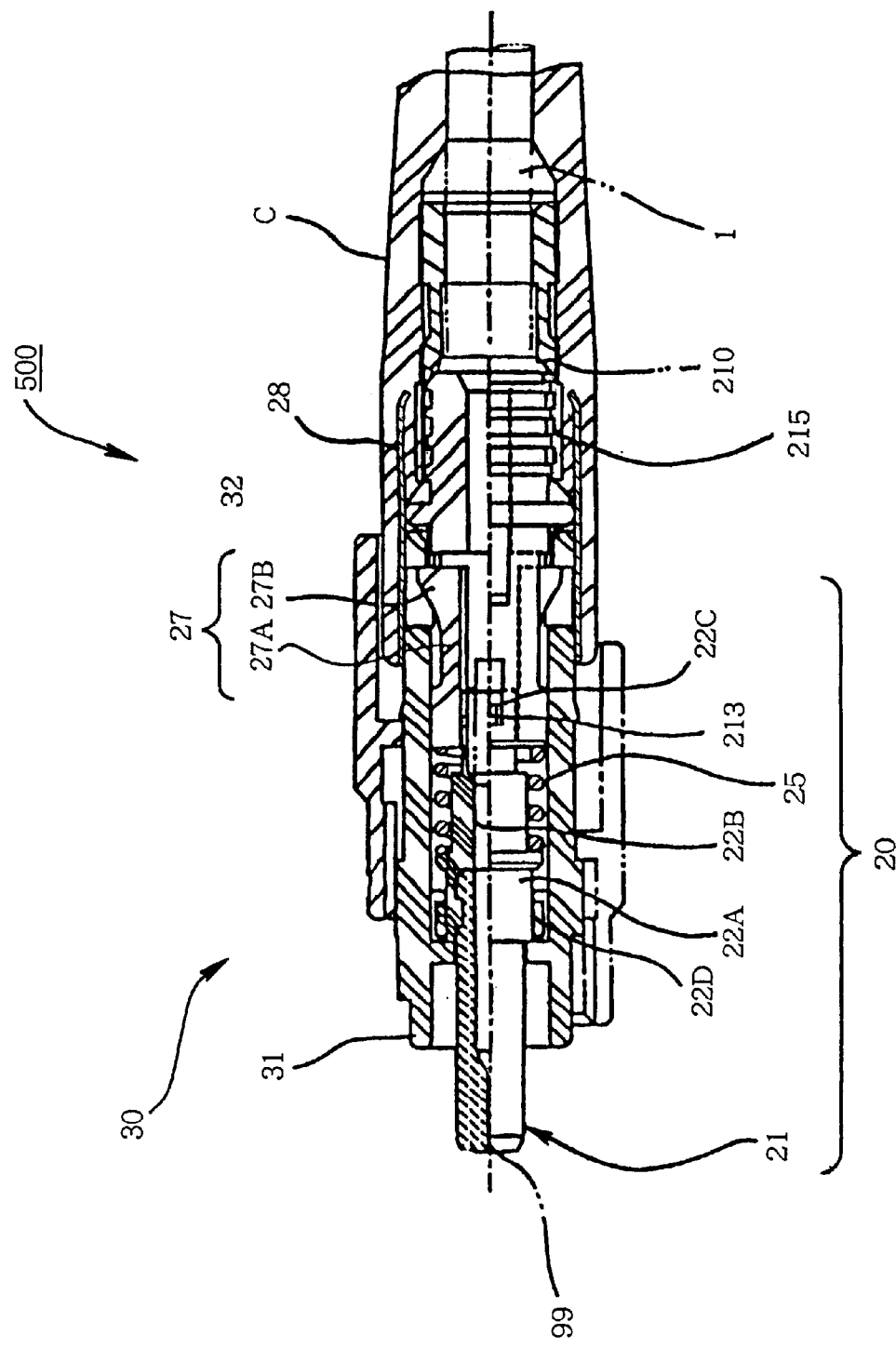
FIG. 19 is a cross sectional view of a universal optical fiber connector as a ninth embodiment of the present invention.

FIG. 19 is a cross-sectional view of an assembled structure of an optical fiber connector as one of the preferred embodiments of the present invention. As shown in the figure, a basic configuration of an optical fiber connector of the present embodiment is a basic plug and a plug housing as shown in FIG. 1.

In the present embodiment, a reinforcing cylindrical pipe 28 is placed on an inner peripheral surface of a hood C being attached to the rear end of assembled universal optical fiber connector 500. The reinforcing cylindrical pipe 28 is made of a metal such a nickel-plated brass, stainless steel, or the like and is integrally formed by an insert molding simultaneously with the step of forming the hood C.

One end of the reinforcing cylindrical pipe 28 is fitted onto one end of the plug housing 30, while the other end thereof surrounds a cylindrical member 215 that fixes a tensile strength body 210 on the other end of the basic plug 20.

Accordingly, the optical fiber connector 500 of the present embodiment increases in strength by mounting the reinforce metal pipe on an inner peripheral surface of the hood C. If the hood C and its surrounding areas receive external stress, for example large bending stress through an optical fiber cable 1 or presses beneath the feet, in a connected state, the reinforce pipe 28 transfers the stress to the plug housing 30. Therefore, the cylindrical member fixed on the other end of the basic plug 20 hardly receives stress, so that a fracture or distortion in the basic plug 20 may be prevented.

For the optical fiber connector 500 of the present embodiment described above, the reinforce cylindrical pipe 28 is arranged on an inner peripheral surface of the hood C. However, it is also possible to arrange the reinforce cylindrical pipe 28 on an outer peripheral surface of the hood C or in an inside of thereof. In addition, the reinforce pipe 28 may be shaped into a rectangle so as to fit to the shape of optical fiber connector. Furthermore, the reinforce pipe 28 may be provided as a separate equipment to be attached to the hood C if required. It is essential only that the assembled optical fiber connector is configured so that one end portion of the reinforce pipe 28 is fitted to the outside of basic plug 20 which is inner of the one end portion thereof (by which the cylindrical member 215 is swaged) and the other end portion of the reinforce pipe 28 covers the cylindrical member 215 having a tensile strength body 210 being fixed on the end portion of the basic plug 20.

Furthermore, a basic configuration of the optical fiber connector is not restricted by the present embodiment. It is also possible to prepare the optical fiber connector by means of resin molding in which a brim, a compression spring, and a stopper may be molded in one piece.

According to the optical fiber connector of Embodiment 9 of the present invention, a ferrule is connected to one end portion of the basic plug and is covered with a plug frame so as to receive the force from a press means at the time of connection. On the other hand, the other end portion of the basic plug has an engagement ring for fixing a tensile strength body on an outer peripheral surface of that portion. Then this fixed portion is covered with the hood to be fixed on an outer peripheral surface of the plug frame. Furthermore, the reinforce pipe is placed, for example, on an inner peripheral surface of the hood, so that the strength of the hood and the optical fiber connector is improved. Therefore, any stress or force (such as bending stress, tensile force, or shearing force) applied on the hood is hardly transmitted to the basic plug, so that we can provide the optical fiber connector without causing any damage, such as stress cracking, in a quest to obtain greater durability.

Embodiment 10

Figure 20:
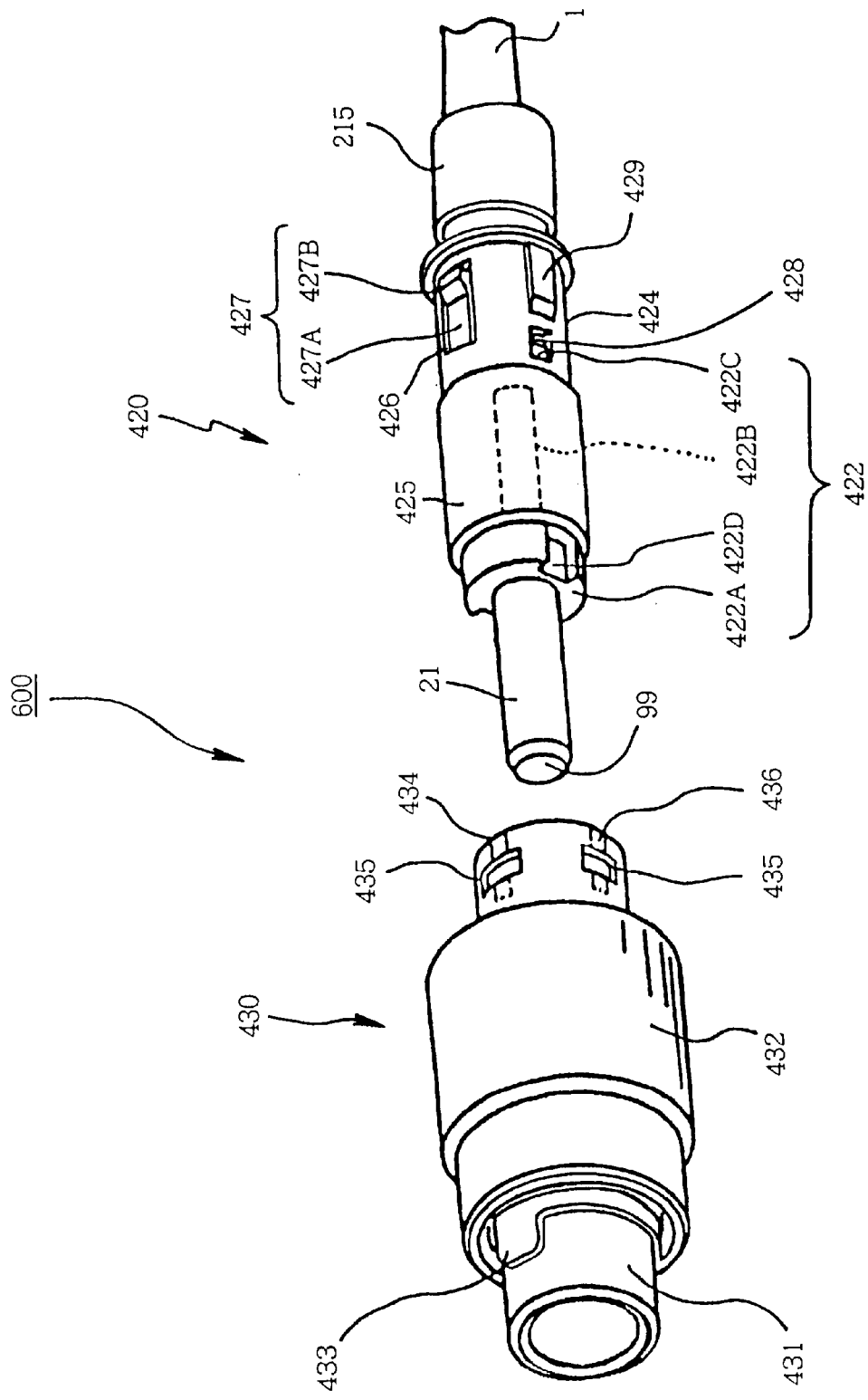
FIG. 20 is a perspective view of a universal optical fiber connector as a tenth embodiment of the present invention.
Figure 21:
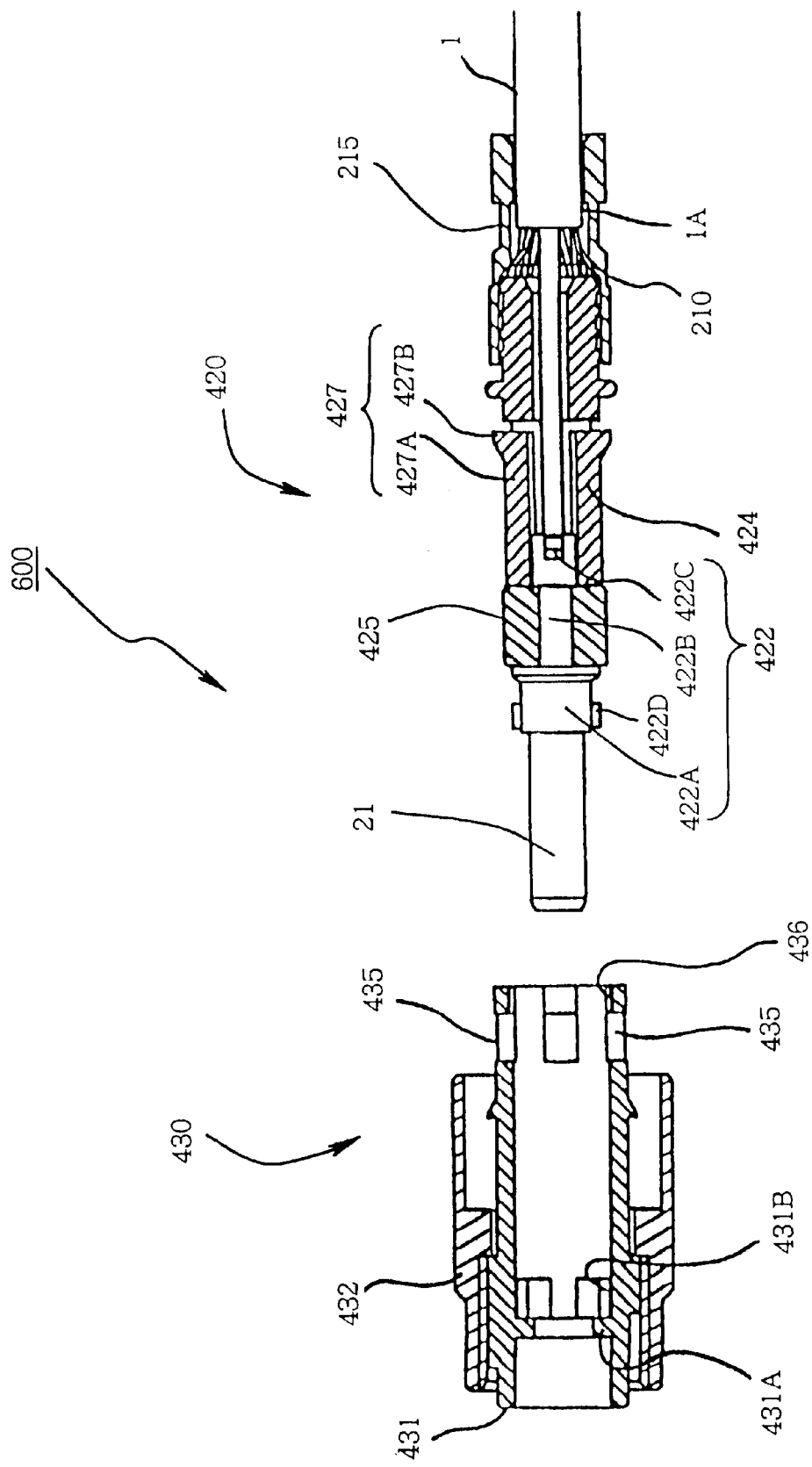
FIG. 21 is a cross sectional view of the universal optical fiber connector as the tenth embodiment of the present invention.

FIG. 20 is an exploded perspective view of a universal optical fiber connector as one of the preferred embodiments of the present invention, while FIG. 21 is a cross-sectional view of FIG. 20.

A universal optical fiber connector 600 shown in these figures is in the type for connecting to an adapter of a FC-type connector model. The optical fiber connector 600 comprises: a ferrule-holding member 420 in which a single optical fiber cable 1 is coaxially fixed; and a FC plug housing 430 for holding the ferrule-holding member 420 for connecting it to the FC-connector type adapter.

The ferrule-holding member 420 comprises: a ferrule 21 that holds the optical fiber cable 1; a tubular member 422 having a brim 422A and coaxially fixed on the rear end of the ferrule 21; a ferrule-forcing member 425 that holds the rear end of the tubular member 422; and a cylindrical tube 424 to be coaxially fitted on the tubular member 422 in a slideable manner. Thus, the rear end of the cylindrical tube 424 secures a tip 1A (FIG. 21) of the optical fiber by means of a tensile strength material 210 (FIG. 21). In this case, the tensile strength material 210 is placed over the rear end portion of the cylindrical tube 424, followed by crimping or boding a cylindrical member 215. The, the ferrule 21 has at least one common dimensional structure compatible with various connector models.

The ferrule-forcing member 425, which is secured between the brim 422A of the tubular member 422 and the cylindrical tube 424, is made of rubber or elastomer and is installed so as to exert elastic deformation forces against them in opposite directions to keep them separated. That is, the tubular member 422 and the ferrule 21 are constructed as an elastic-floating structure in which they are elastomer-loaded toward a front end of the ferrule 21 with respect to the cylindrical tube 424.

To be more specific in the present embodiment, a long-sized cylindrical portion 422B passing through the ferrule-forcing member 425 is integrally formed on the rear end portion of the brim 422A of the tubular member 422 and is extended along the lengthwise direction of the cylindrical tube 424. An outer peripheral surface of the rear end portion of the cylindrical portion 422B has protrusions 422C which are formed so as to be flexibly distorted inwardly along the diameter of the cylindrical portion 422B. IN the front end portion of the cylindrical tube 424, there are square openings 428 (FIG. 20) into which the respective protrusions 424C are inserted with a space enough to slide along the length width direction of the cylindrical tube 424. If the tubular member 242 moves forward with respect to the cylindrical tube 424, its movement is restricted by contacting the protrusion 424C with a front side of the square opening 428.

In a state of being free, the contact between the protrusion 422C and the front side of the square opening 428 is maintained by pushing the tubular member 422 forward by an extending force of the ferrule-forcing member 425. If the tubular member 422 is forcefully pushed backward against the extending force of the ferrule-forcing member 425, the protrusion 422C can be slid along its axial direction in the square opening 428 to shift the positions of both of the ferrule 21 and the tubular member 422 with respect to the cylindrical tube 424. The movement of the ferrule 21 against the elastic deformation force of the ferrule-forcing member 425 is limited by contacting the protrusion 22C with the rear side of the square opening 213 or by the elastic limit of the ferrule-forcing member 425.

An elastomer-loaded engagement piece 427 is integrally formed on the other end (i.e., the rear end) portion of the cylindrical tube 424 and comprises a tongued strip 427A provided by forming a U-shaped slit 426 in the peripheral surface of the cylindrical tube 24 and an engagement protrusion 427B formed and extended on a free end of the tongued strip 427A. Therefore, the engagement protrusion 427B on that free end can be displaced in the outward or inward direction by an effect of elastic deformation of the tongued strip 427A. In this embodiment, there are two tongued strips 427A spaced-apart 180 degrees in a circumferential direction of the cylindrical tubule 424. The engagement protrusion 427B has a wedge-shape where the thickness thereof is gradually increased from a boundary of the tongued strip 427A and the engagement protrusion 427B to an opposite end of the latter, resulting in a substantial protrusion through the peripheral surface of the cylindrical tube 424. In addition, a rectangular protruded region 429 is formed on an outer peripheral surface of the cylindrical tube 424, with 90 degrees deviation from the engagement protrusion 427B along the circumferential direction of the cylindrical tube 424. As shown in the figure, there is a gradual decrease in thickness of a front end portion (i.e., formed as a tapered portion) of the protruded region 429 to smooth the path to engage with a groove 436 described below.

The ferrule-forcing member 425 may be selected from, for example, the group of silicon rubber, acrylonitrile-butadiene rubber (NBR), natural rubber, isopropylene rubber, chloroprene rubber, fluorine rubber, polyurethane elastomer, and polyester elastomer, molded in a cylindrical shape.

The FC plug housing 430 comprises a thread-fastening member 432 fitted to a mating member 431 for receiving the ferrule-holding member 420. In addition, a key ring 433 is fixed on an outer peripheral surface of the mating member 431 by an appropriate means and is provided as an index key that has the function of adjusting the direction of core eccentricity to make sure the mating member 431 is in the right place. The structure of fixing the key ring 433 on the mating member 431 is, for example a well-known conventional structure as shown in FIG. 24.

The other end of the mating member 431, which is on the side of receiving the ferrule-holding member 420, is formed as a ferrule-inserting end portion 434. Furthermore, engaging slots 435 are formed in a peripheral surface of the ferrule-inserting end portion 434 at established intervals. In this embodiment, there are four engaging slots 435 allowing 90 degrees spacing. A groove 436 to be matched with that protruded region 429 is formed in an inner surface of the FC plug housing 430.

When the ferrule-holding member 420 is gradually inserted into the FC plug housing 430 through the insert end portion 434, the engagement protrusion 427B contacts with an inner edge of the insert end portion 434 and is gradually pushed into the cylindrical tube 424 at the time of passing the engagement protrusion 427B through the insert end portion 434. Then the engagement protrusion 427B is engaged into the engaging slot 435 by recovering its original state by the elasticity of the tongue piece 427A when the engagement protrusion 427B faces one of the engaging slots 435. In this state, the ferrule-holding member 420 is coupled to the FC plug housing 430.

Thus, inserting the ferrule-holding member 420 into the FC plug housing 430 leads to mate the groove 436 and the protruded region 429 together, resulting in restrictions on the relative turns of the ferrule-holding member 420 and the FC plug housing 430 in the directions of their circumferences, respectively.

For the step of inserting the ferrule-holding member 420 into the insert end portion 434 of the FC plug housing 430, each structural element is designed to predetermined dimensions so that the brim portion 422A comes into contact with a flange 431A (FIG. 21) in an inward direction of the mating member 431 prior to engaging the engagement protrusion 427B into the engaging slot 435. Thus the ferrule-forcing member 425 is being compressed when the engagement protrusion 427B is engaged in any engaging slot 435. If the mating member 431 and the cylindrical tube 424 are coupled together by engaging the engagement protrusion 427B into the engaging slot 435, an extending force of the ferrule-forcing member 425 pushes the ferrule 21 against the flange 431A, and subsequently the ferrule 21 is fixed into the flange 431A and then housed therein. Namely, the FC plug housing 430 and the basic plug 420 are in a state of established assembly.

For cancelling the assembly state, the engaging protrusion 427B is forcefully pushed down against an elastic force of the tongued strip 427A that tends to push it up to release the engagement between the engagement protrusion 427B and the engaging slot 427B, resulting that the cylindrical tube 424 is removed quickly from the mating member 431 by an extending force of the ferrule-forcing member 425, resulting in a release from the assembly state.

The process of adjusting the center of the key ring 433 and the direction of the core eccentricity so that they are in proper relative position can be attained by positioning the engagement protrusion 427B relative to the mating member 431 in a circumferential direction. More specifically, for the alignment to lead them in the right place, a plurality of grooves 422D are formed in an outer peripheral surface of the brim position 422A and also a plurality of keys 431B (FIG. 21) to be fit into their respective grooves 422D are protruded from an inner surface of the mating member 431, configuring so-called directional coupling key elements. Therefore, the best relative position of the key ring 433 and the direction of core eccentricity can be adjusted by shifting a phase of fitting the key 431B into the groove 422B by turning them relatively in a circumferential direction.

Embodiment 11

Figure 22:
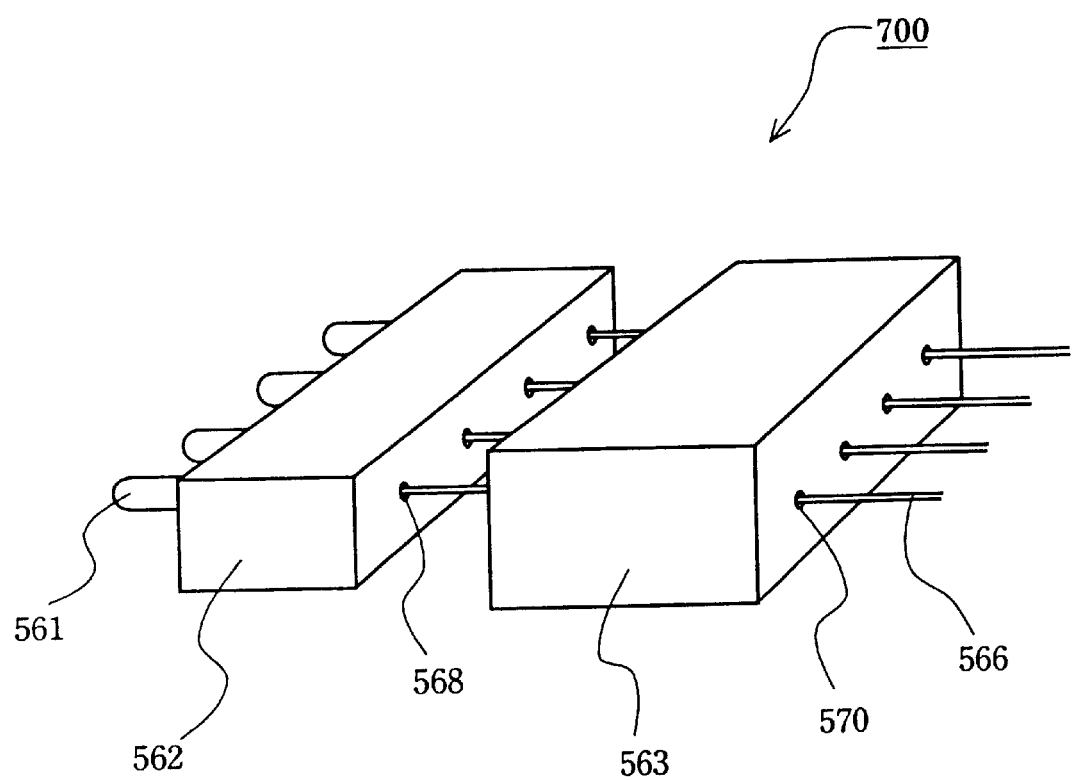
FIG. 22 is a perspective view of a universal optical fiber connector as an eleventh embodiment of the present invention.
Figure 23:
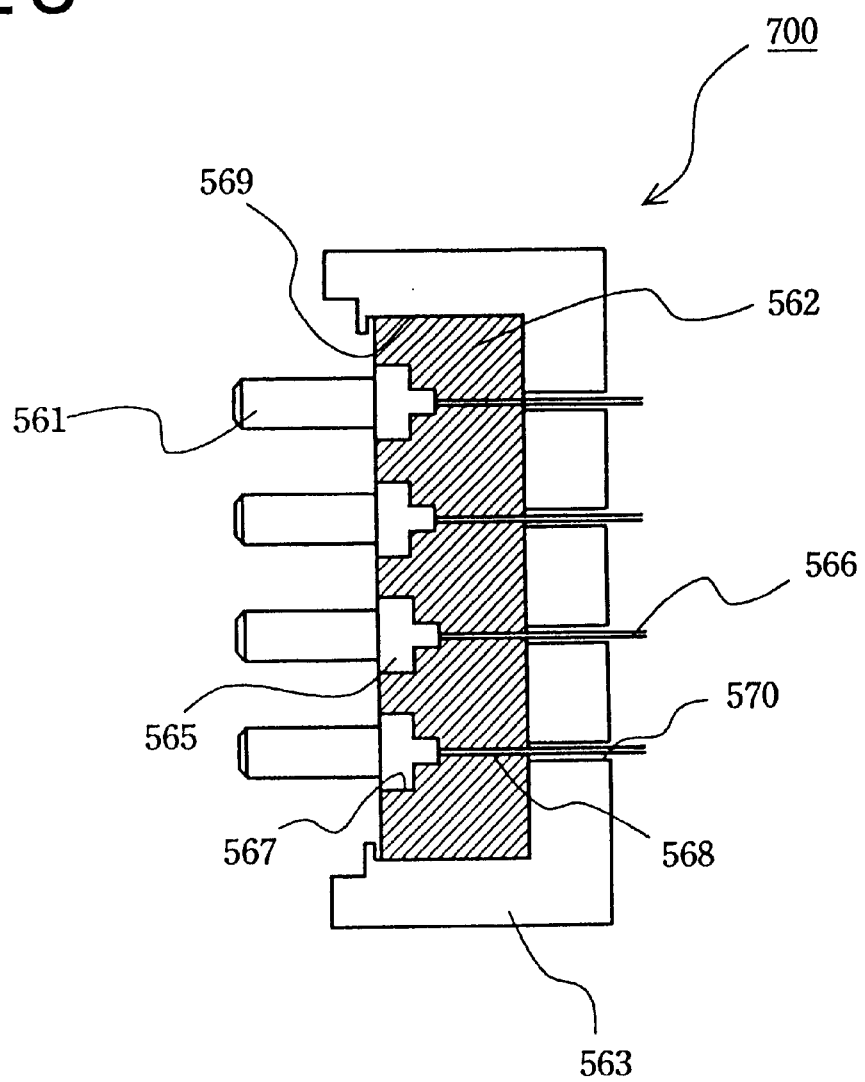
FIG. 23 is a cross sectional view of the universal optical fiber connector as the eleventh embodiment of the present invention.

FIG. 22 is a perspective view in schematic form depicting a multiple optical fiber connector assembly as another preferred embodiment of the present invention, and FIG. 23 is a cross-sectional view of the optical fiber connector assembly shown in FIG. 22.

A multiple optical fiber connector assembly comprises a plurality of ferrules in parallel. As shown in FIGS. 22 and 23, a multiple ferrule-holding structure 700 of the present embodiment comprises: a plurality of ferrules (four ferrules in this embodiment); a ferrule-forcing member 562 made of rubber or elastomer; or a housing 563 for holding the ferrule-forcing member 562.

The ferrule 561 has a collar portion 565 on its rear end, while the core of an optical fiber comes into the middle of the ferrule 561 and is fixed therein. A ferrule-forcing member 562 is coupled to the collar portion 565 to exert a press force to the ferrules 561. The ferrule-forcing member 562 is provided as a rectangular-shaped rubber or elastomer with portions for mounting a plurality of ferrules 561 and collar portions 565. Namely, the portions includes a plurality of grooves 567 in which the collar portions 565 are fitted and a plurality of through-holes into which the nylon jacked optical fibers are inserted. The ferrule-forcing member 562 may be foremd as two separated components for sandwiching a plurality of ferrules 561 between them. In addition, the housing 561 has a pit portion 569 in which the ferrule-forcing member 562 can be fitted and through-holes 570 drilled through the bottom of the pit portion 591. Each nylon jacketed optical fiber passes through the through-hole 570 from the outside of the housing.

Therefore, each ferrule 561 is held in the housing 563 in a manner that the ferrule 561 is able to move in an axial direction thereof by an effect of elastic deformation of the ferrule-forcing member 562. Thus the ferrule 561 can be optically connected to another connector or the like. That is, the optical connection with any one of various optical fiber connectors can be attained by assembling the multiple ferrule-holding structure into a casing compatible with the multiple optical fiber connectors of various specifications.

In this embodiment, a plurality of the ferrules is held in one ferrule-forcing member but not limited to this configuration. For example, ferrules may be held in their respective tubular or rectangular ferrule-forcing components in one housing.

In a quest to give the optical fiber connector greater durability, it is easy to keep each of the optical fiber connectors of Embodiments 10 and 11 rust free if the elastic member for applying a press force to the ferrule is made of a rubber or elastomer material as described above. In a quest to attain cost-reduction, it is easy to reduce the number of components in the optical fiber connector because of the configuration described above. Furthermore, it is easy to be compatible with connectors of various forms because the elastic member can be formed in any shape.

What is claimed is:

1. A plug for an optical fiber connector, the plug comprising: a ferrule for supporting a first end portion of an optical fiber opposite a second end portion thereof embedded in an optical fiber cable, the ferrule having an axis extending in an axial direction thereof; a first tubular member having a flange connected to an end of the ferrule and a cylindrical portion extending from the flange and coaxial with the ferrule, the cylindrical portion having a protrusion disposed at an end portion thereof; a spring element disposed over the cylindrical portion of the first tubular member for biasing the ferrule in the axial direction; and a second tubular member having a first end, a second end opposite the first end for connection to the optical fiber cable, and a hole for engagement with the protrusion of the cylindrical portion of the first tubular member to firmly hold the second tubular member in place so as to firmly support the spring element between the first end of the second tubular member and the flange of the first tubular member.

2. A plug as claimed is claim 1; wherein the protrusion comprises a flexible engaging portion which protrudes radially from the cylindrical portion of the first tubular member and which undergoes deformation in a radial direction of the cylindrical portion to engage the hole of the second tubular member.

3. A plug as claimed in claim 1; wherein the protrusion of the first tubular member comprises a flexible engaging portion which undergoes deformation to engage the hole of the second tubular member.

4. A universal optical fiber connector, comprising: a ferrule for supporting a first end portion of an optical fiber opposite a second end portion thereof embedded in an optical fiber cable, the ferrule having an axis extending in an axial direction thereof; a tubular housing member for receiving the ferrule for connection to another ferrule through the tubular housing member; a first tubular member having a flange connected to an end of the ferrule and a cylindrical portion extending from the flange and coaxial with the ferrule, the cylindrical portion having a protrusion disposed at an end portion thereof; a spring element disposed over the cylindrical portion of the first tubular member for biasing the ferrule in the axial direction; and a second tubular member having a first end, a second end opposite the first end for connection to the optical fiber cable, and a hole for engagement with the protrusion of the cylindrical portion of the first tubular member to firmly hold the second tubular member in place so as to firmly support the spring element between the first end of the second tubular member and the flange of the first tubular member.

5. An optical fiber connector as claimed in claim 4; wherein the tubular housing member has a sleeve adapted to receive the second tubular member.

6. An optical fiber connector as claimed in claim 5; wherein the tubular housing member has a key member for aligning the ferrule in the housing in the axial direction, and the sleeve has a plurality of engaging holes; and wherein the second tubular member has at least one elastic engaging piece for engaging one of the engaging holes when the second tubular member is received by the sleeve.

7. A plug for an optical fiber connector, the plug comprising: a ferrule extending in an axial direction and adapted for insertion of an optical fiber therein; a first tubular member having a first open end for connection to an end of the ferrule, a flange extending radially from the first open end, and a cylindrical portion extending from the flange in coaxial relation with the ferrule; a spring element disposed over a peripheral surface of the first tubular member for biasing the ferrule in the axial direction; a second tubular member having an open end for receiving a second en of the first tubular member opposite the first open end thereof, the first tubular member extending into the second tubular member in the axial direction; connecting means for connecting the first tubular member to the second tubular member to firmly hold the second tubular member in place so as to firmly support the spring element between the open end of the second tubular member and the flange of the first tubular member; and restricting means for restricting the amount of extension of the first tubular member into the second tubular member.

* * * * *